(12) United States Patent  (10) Patent No.: US 9,012,572 B2
Lin et al.  (45) Date of Patent: Apr. 21, 2015

(54) POLYPHENYLENE ETHER OLIGOMER AND ARTICLE EMPLOYING THE SAME

(71) Applicant: Industrial Technology Research Institute, Hsinchu (TW)

(72) Inventors: I-Hong Lin, Luodong Township (TW); Chung-Cheng Lin, Kaohsiung (TW); Wei-Ta Yang, Jhongli (TW); Chih-Hsiang Lin, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/141,005

(22) Filed: Dec. 26, 2013

(65) Prior Publication Data

US 2014/0323666 A1 Oct. 30, 2014

(30) Foreign Application Priority Data

Apr. 30, 2013 (TW) ............... 102115366 A
Dec. 3, 2013 (TW) ............... 102144177 A

(51) Int. Cl.
*C08F 283/08* (2006.01)
*C08G 65/48* (2006.01)
*C08G 65/44* (2006.01)
*C08G 63/78* (2006.01)

(52) U.S. Cl.
CPC ............. *C08G 65/485* (2013.01); *C08G 65/44* (2013.01)

(58) Field of Classification Search
USPC ........... 525/390, 391, 396; 528/205, 212, 215
See application file for complete search history.

(56) References Cited

U.S. PATENT DOCUMENTS

| 5,750,310 | A | 5/1998 | Sato et al. |
| 2003/0194562 | A1 | 10/2003 | Ishii et al. |
| 2007/0122627 | A1 | 5/2007 | Davis et al. |
| 2008/0132637 | A1 | 6/2008 | Tokiwa |
| 2010/0048826 | A1 | 2/2010 | Ishii et al. |

FOREIGN PATENT DOCUMENTS

| EP | 0 382 312 A2 | 8/1990 |
| EP | 1832617 | * 8/2007 |
| JP | 2010-118115 A | 5/2010 |
| JP | 2011-246681 A | 12/2011 |
| TW | 200406442 A | 8/1990 |

OTHER PUBLICATIONS

Chalk, A.J. et al, "Direct Metalation of Poly(2,6-dimethyl-1,4-phenylene ether)," Journal of Polymer Science: Part A-1, 1969, vol. 7, pp. 691-705.
Huang, C.C. et al, "Synthesis of New Thermosetting Poly(2,6-dimethyl-1,4-phenylene oxide)s Containing Epoxide Pendant Groups," Journal of Polymer Science: Part A: Polymer Chemistry, 2006, vol. 44, pp. 5875-5886.
Hwang, H.J. et al, "Low Dielectric Thermoset from Redistributed Poly(phenylene oxide)," Journal of Macromolecular Science, Part A: Pure and Applied Chemistry, 2008, vol. 45, pp. 1047-1054.
Lee, T.J. et al, "Synthesis, structures and thermal properties of new class epoxide-terminated telechelic poly(2,6-dimethyl-1,4-phenylene oxide)s," Polymer, 2007, vol. 48, pp. 734-742.
Matsumoto, K. et al, "Synthesis of Photosensitive and Thermosetting Poly(phenylene ether) Based on Poly[2,6-di(3-methyl-2-butenyl)phenol-co-2,6-dimethly-phenol] and a Photoacid Generator," Journal of Polymer Science: Part A: Polymer Chemistry, 2005, vol. 43, pp. 149-156.

* cited by examiner

*Primary Examiner* — Terressa Boykin
(74) *Attorney, Agent, or Firm* — Birch, Stewart, Kolasch & Birch, LLP

(57) ABSTRACT

A polyphenylene ether oligomer is provided. The polyphenylene ether oligomer has the following formula (I):

formula (I)

X is

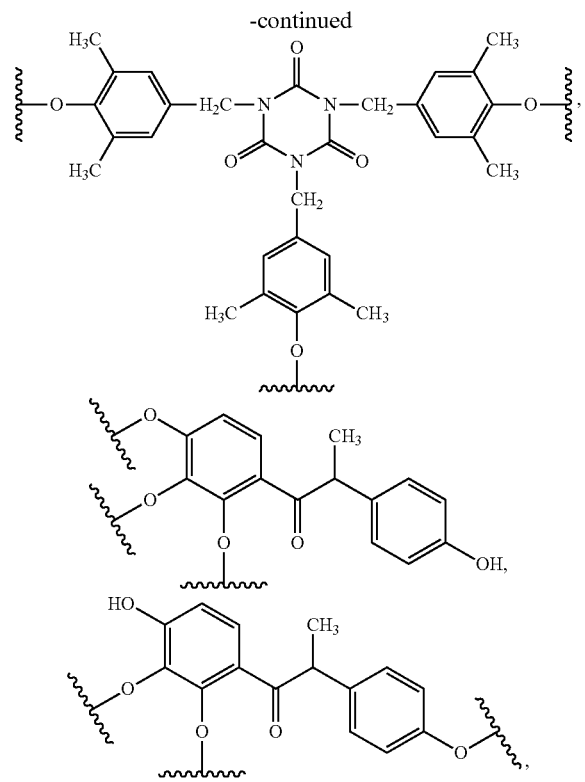
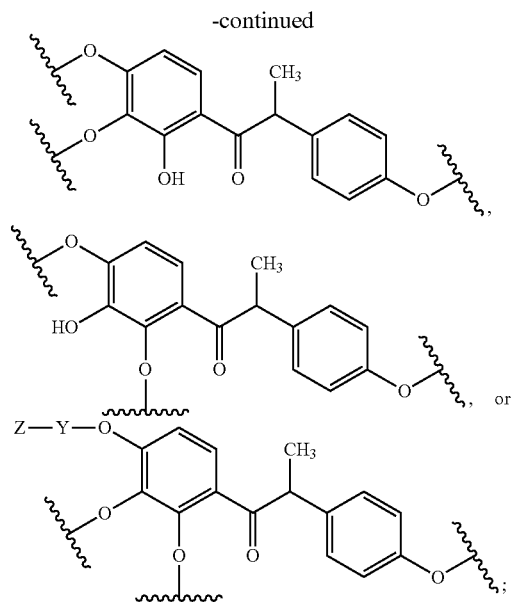
R is H or $C_{1-6}$ alkyl group; Y independently is a moiety polymerized by at least two different phenol-based compounds; and Z independently is H, acryloyl group, allyl group, vinylbenzyl group, epoxypropyl group, methylacryloyl group, propargyl group, or cyanoallyl group.
10 Claims, 11 Drawing Sheets

POLYPHENYLENE ETHER OLIGOMER AND ARTICLE EMPLOYING THE SAME

CROSS REFERENCE TO RELATED APPLICATION

The present application is based on, and claims priorities from, Taiwan Application Serial Number 102115366, filed on Apr. 30, 2013, and Taiwan Application Serial Number 102144177, filed on Dec. 3, 2013 the disclosure of which is hereby incorporated by reference herein in its entirety.

TECHNICAL FIELD

The technical field relates to polyphenylene ether oligomers.

BACKGROUND

Communication electronic industry has grown rapidly, and development of polymer with high thermal resistance, low dielectric coefficient, and high toughness is desired such that these materials can be used in next-generation electronic packages or high frequency substrates. Polyphenylene ether (PPE), also called polyphenylene oxide (PPO), is a high performance material. However, compatibility between thermoplastic polyphenylene ether and thermosetting polyphenylene ether is poor, and their solubility is low. Therefore, applications of polyphenylene ether materials are limited.

Therefore, development of novel polyphenylene ether materials is desired. For example, polyphenylene ether materials can be used, but are not limited to, to form high frequency substrates, high temperature additives, coating materials, adhesives, or the like.

SUMMARY

A detailed description is given in the following embodiments with reference to the accompanying drawings.

In some embodiments, a polyphenylene ether oligomer has the following

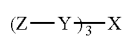 formula (I)

X is

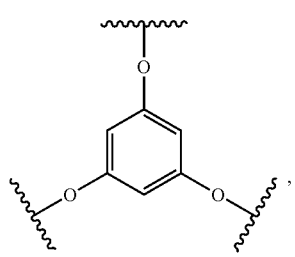

-continued

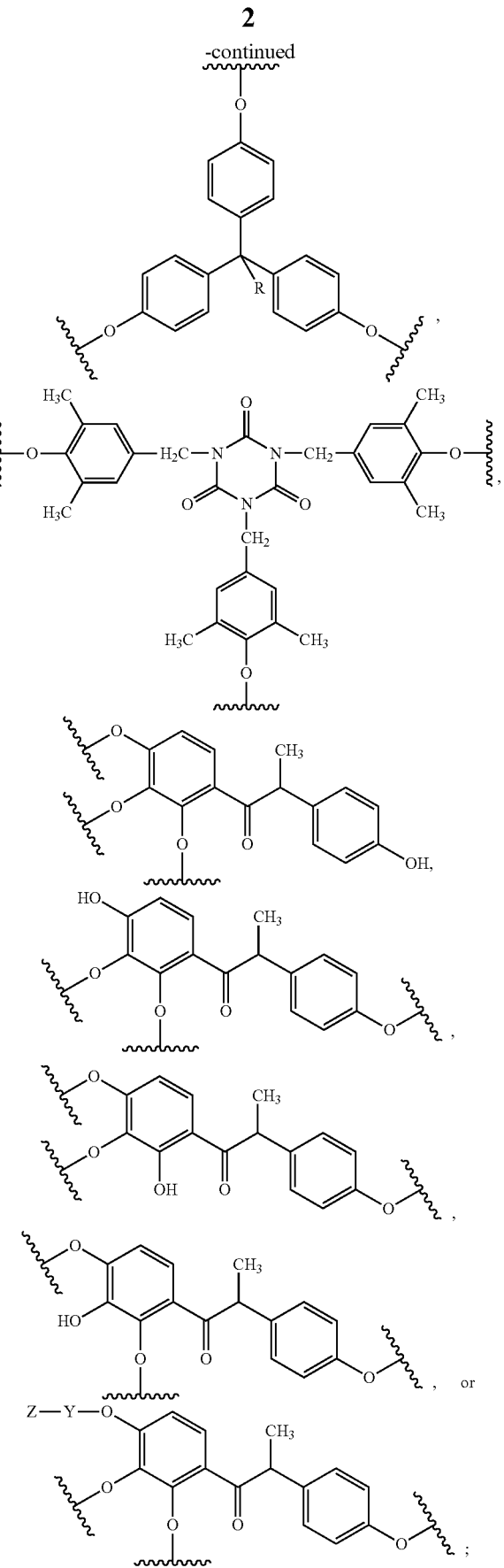

R is H or $C_{1-6}$ alkyl group; Y independently is a moiety polymerized by at least two different phenol-based compounds; and Z independently is H, acryloyl group, allyl group, vinylbenzyl group, epoxypropyl group, methylacryloyl group, propargyl group, or cyanoallyl group.

In some embodiments, an article including the aforementioned polyphenylene ether oligomer is provided. In particular, the article can be a high frequency substrate, high temperature additive, coating material, or adhesive.

BRIEF DESCRIPTION OF DRAWINGS

The present invention can be more fully understood by reading the subsequent detailed description and examples with references made to the accompanying drawings, wherein.

DETAILED DESCRIPTION

Figure 1:
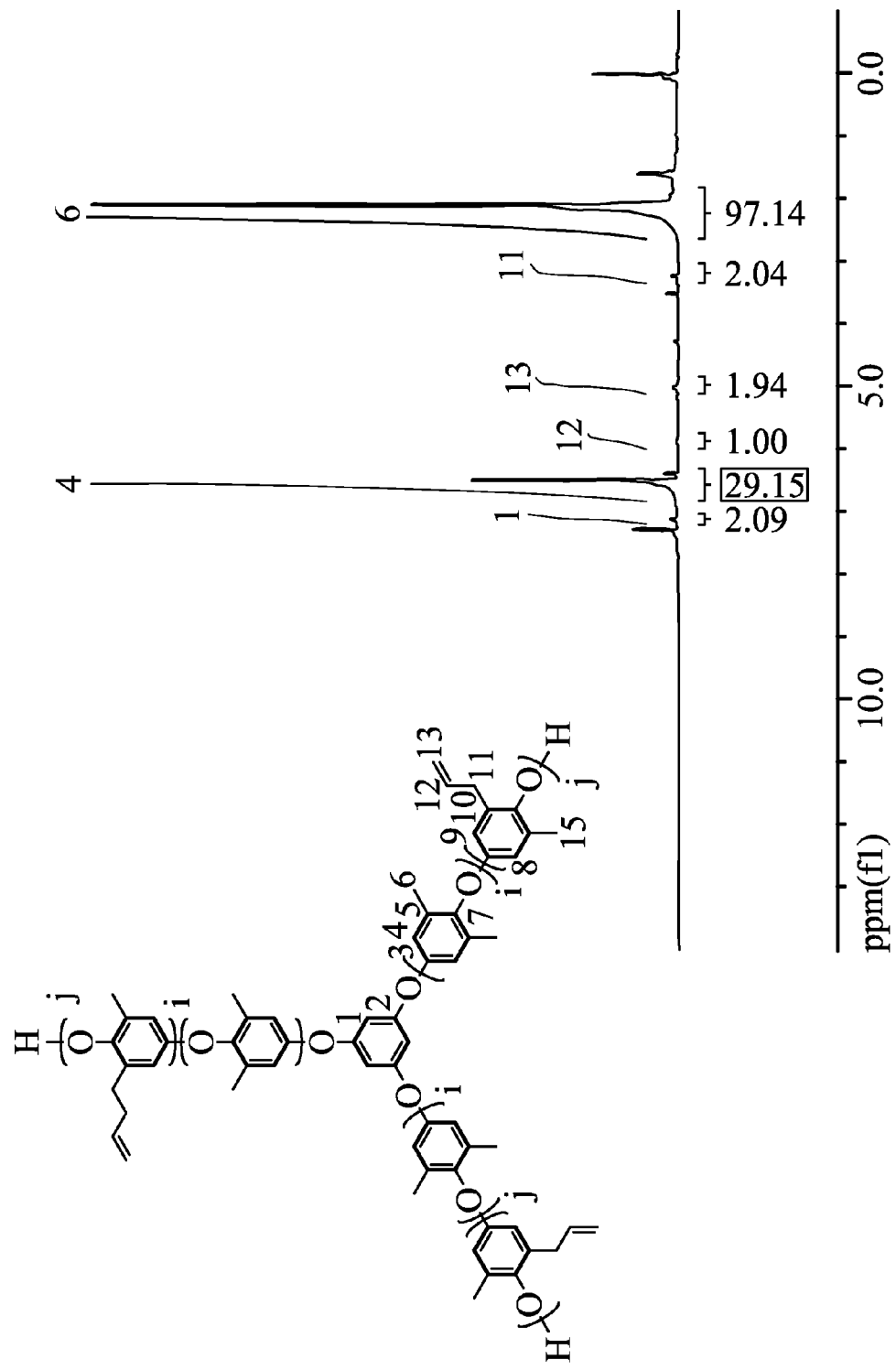
FIG. 1 illustrates the $^1$H-NMR spectrum of the polyphenylene ether oligomer 1 prepared from Example 1.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A polyphenylene ether oligomer is provided in accordance with some embodiments. The polyphenylene ether oligomer contains a core structure, at least three main chains bonded onto the core structure (each main chain may have the same or different moieties from each other), and end groups bonded to an end of each of the main chains (each end group may be the same or different from each other). In other words, the polyphenylene ether oligomer with a branch structure is formed by bonding at least three main chains onto the core structure. In addition, in accordance with some embodiments, the ends of the main chains are modified by the end groups to improve some physical properties of the polyphenylene ether.

In some embodiments, the main chains and/or the end groups contain functional groups, such as allyl groups, introduced by copolymerization, and physical properties of the resulting polyphenylene ether oligomer is improved. For example, the polyphenylene ether oligomer may have adjustable thermal crosslinking intensity, good flowability in subsequent curing processes, low dielectric coefficient, high thermal resistance, good size stability, or low hygroscopicity.

In some embodiments, the polyphenylene ether oligomer is formed by one-step polymerization, and the required process and cost are therefore reduced.

In some embodiments, the polyphenylene ether oligomer has the following formula (I):

formula (I)

In formula (I), X is

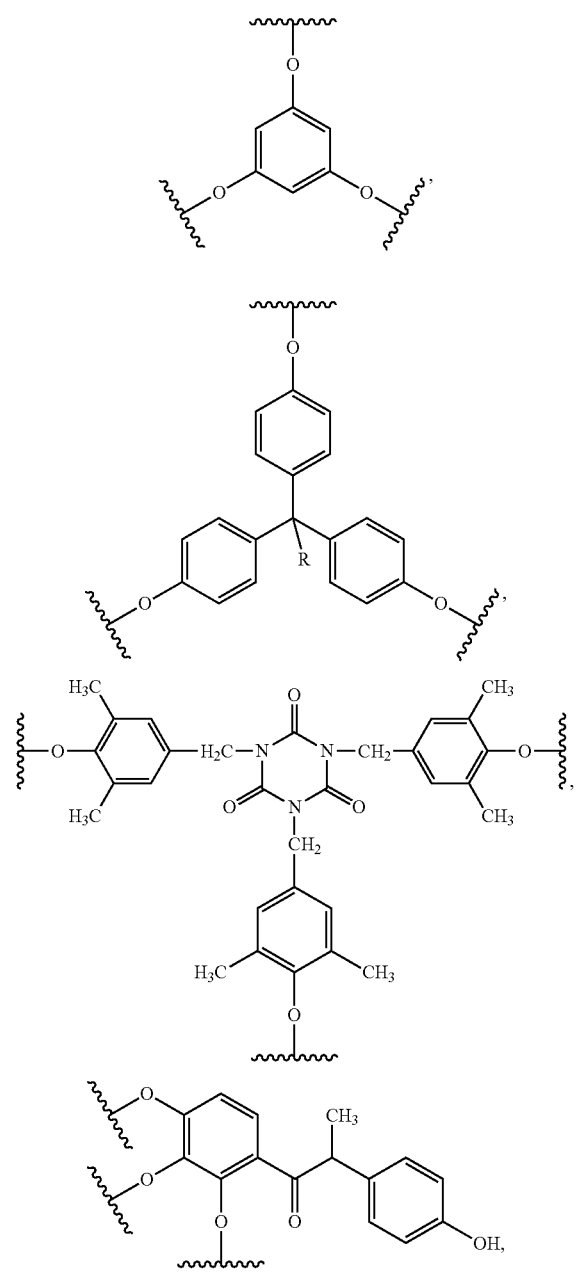

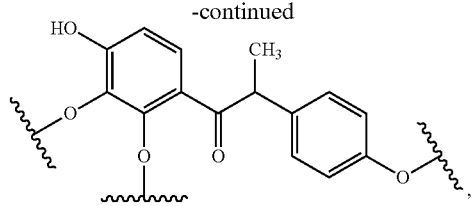

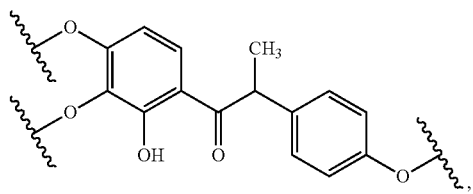

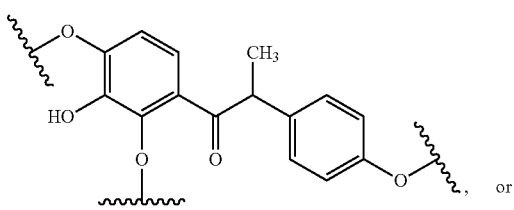, or

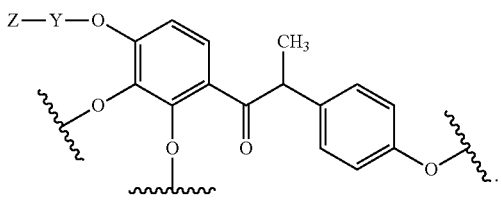

X is bonded to Y through oxygen moiety illustrated by O—. R is H or $C_{1-6}$ alkyl group. Y independently is a moiety polymerized by at least two different phenol-based compounds. As shown in formula (I), there are three Y structures in the polyphenylene ether oligomer structure. The moieties of one of the Y structures may be the same or different from the moieties of another one of the Y structures.

Z independently is H, acryloyl group, allyl group, vinylbenzyl group, epoxypropyl group, methylacryloyl group, propargyl group, or cyanoallyl group. Similarly, there are three Z structures in the polyphenylene ether oligomer structure, and one of the Z structures may be the same or different from another one of the Z structures. In some embodiments, a number-average molecular weight of the polyphenylene ether oligomer is larger than 600. In some embodiments, the number-average molecular weight of the polyphenylene ether oligomer is in a range from about 1200 to about 12000.

In some embodiments, Y illustrated in formula (I) represents a structure polymerized by at least two different phenol-based compounds, and each of the phenol-based compounds has at least one substituted group. Examples of the substituted groups include, but are not limited to, methyl group or allyl group. The substituted groups in each of the Y structure in the polyphenylene ether oligomer may be the same or different from each other.

In some embodiments, Y has the following formula:

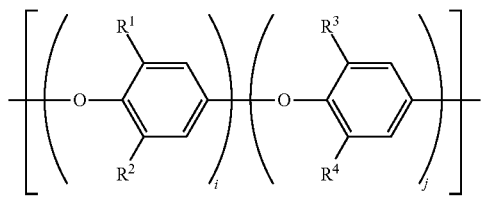

In some embodiments, i is a positive integral, and j is a positive integral. A sum of i and j is in a range from about 6 to about 300. It is noted that the sum of i and j in each Y may be the same or different. $R^1$ is hydrogen, or $C_{1-6}$ alkyl group; $R^2$ is $C_{1-6}$ alkyl group; $R^3$ is hydrogen, or $C_{1-6}$ alkyl group; $R^4$ is $C_{1-6}$ alkyl group, or allyl group; and $R^2$ is different from $R^4$, The repeat unit

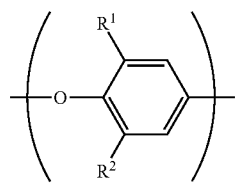

is different from the repeat unit

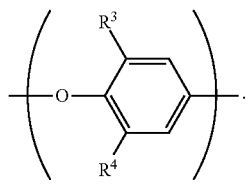.

The repeat units

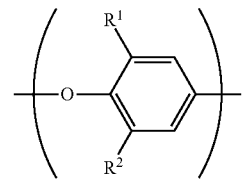

and

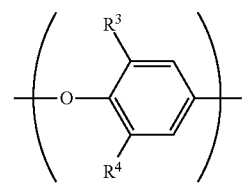

are arranged in an irregular or intermittent order.

In some embodiments, each Y is a moiety polymerized by 2,6-dimethylphenol and 2-allyl-6-methylphenol. For example, Y has the following formula:

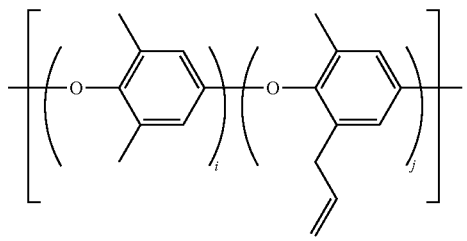

In some embodiments, i is a positive integral, and j is a positive integral. A sum of i and j is in a range from about 6 to about 300, and repeat units

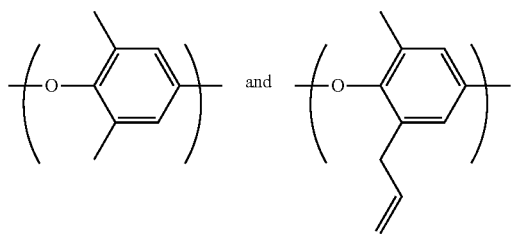

are arranged in an irregular or intermittent order. It is noted that the sum of i and j in each Y may be the same or different.

In some other embodiments, the polyphenylene ether oligomer has the following formula (II)

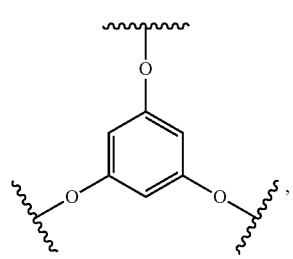

formula (II)

In formula (II), X is

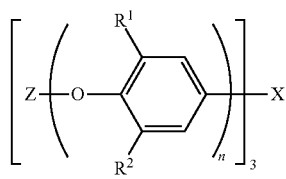

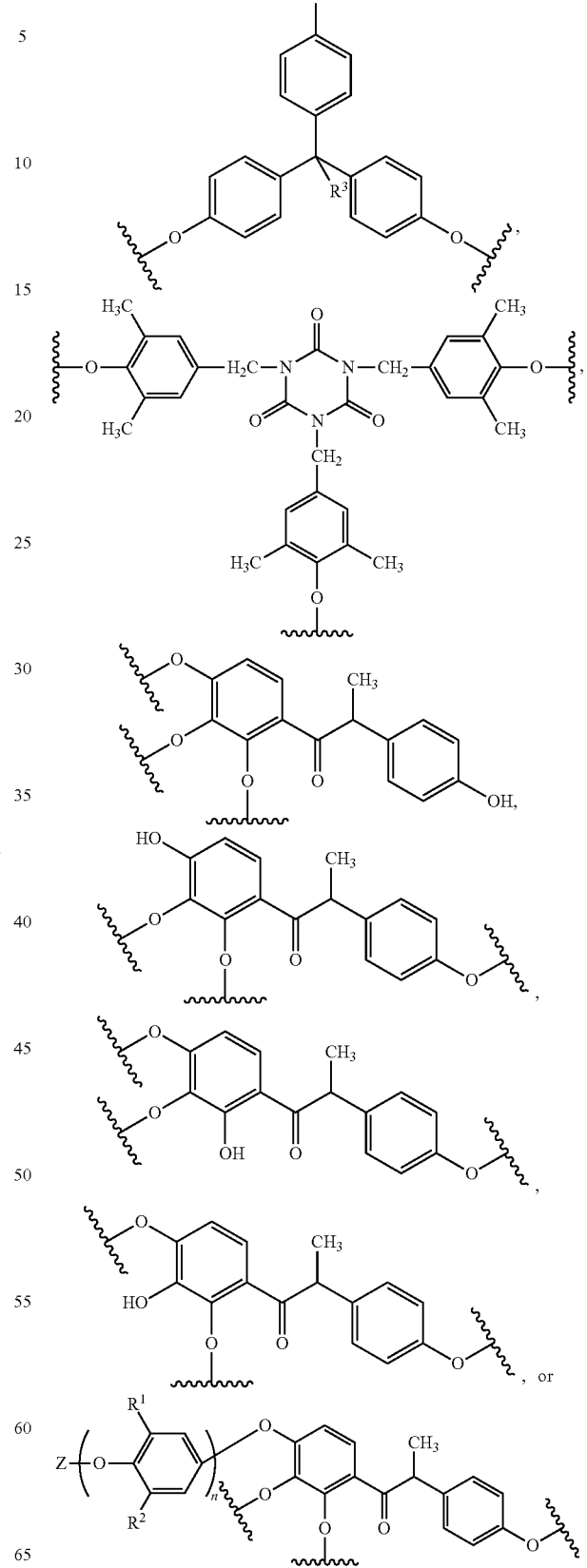

In formula (II), n independently is a positive integral from 60 to 300. R is H or $C_{1-6}$ alkyl group. $R^1$ is H or $C_{1-6}$ alkyl group. $R^2$ is $C_{1-6}$ alkyl group or allyl group independently. Z independently is H, acryloyl group, allyl group, vinylbenzyl group, epoxypropyl group, methylacryloyl group, propargyl group, or cyanoallyl group.

In some embodiments, 1,3,5-trihydroxybenzene is used as an initiator. 2,6-dimethylphenol and 2-allyl-6-methylphenol are added to the initiator to perform an oxidative polymerization reaction, and the polyphenylene ether oligomer is formed. In some embodiments, a molar ratio of 2,6-dimethylphenol to 2-allyl-6-methylphenol is in a range from about 100:1 to about 100:100. In some embodiments, a molar ratio of 2,6-dimethylphenol to 2-allyl-6-methylphenol is in a range from about 100:10 to about 100:20. When the molar ratio of 2,6-dimethylphenol to 2-allyl-6-methylphenol is too small, density of the functional groups in the resulting polyphenylene ether oligomer may be too small. When molar ratio of 2,6-dimethylphenol to 2-allyl-6-methylphenol is too large, the molecular weight of the resulting polyphenylene ether oligomer may be too large.

The polyphenylene ether oligomer formed by the method described above has a core structure derived from 1,3,5-trihydroxybenzene and three main chains bonded onto the core structure. The main chains are copolymerized by 2,6-dimethylphenol and 2-allyl-6-methylphenol, and the ends of the main chains are hydroxyl groups. The resulting polyphenylene ether oligomer has the following formula (III):

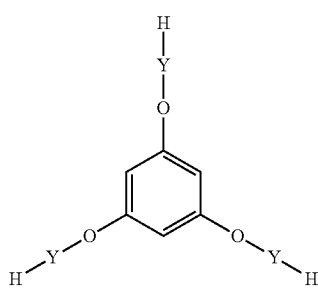

formula (III)

In formula (III), the main chains Y are moieties which are copolymerized by 2,6-dimethylphenol and 2-allyl-6-methylphenol. Therefore, each of the main chains Y has repeat units

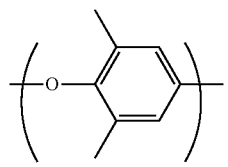

and

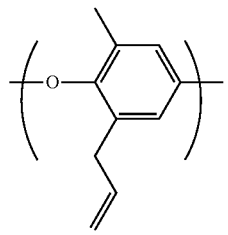

The number of

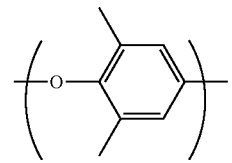

is i, and i is a positive integral. The number of

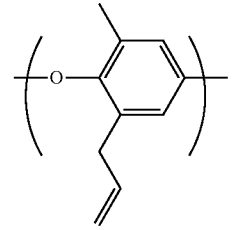

is j, and j is a positive integral. The sum of i and j is in a range of about 6 to about 300. In addition, repeat units

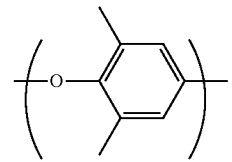

and

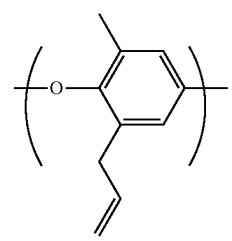

is arranged in an irregular or intermittent order. It is noted that since the two phenol-based moieties (2,6-dimethylphenol and 2-allyl-6-methylphenol) are bonded in an irregular order during the polymerization reaction, each main chain Y is independently having the same or different moieties, and the sum of i and j of each main chain Y may be the same or different.

In some other embodiments, the main chains in formula (III) are further modified, such that the residual hydroxyl group(s) at the end(s) of the main chain(s) is boned to an end group(s), such as acryloyl group, allyl group, vinylbenzyl group, epoxypropyl group, methylacryloyl group, propargyl group, or cyanoallyl group. In some embodiments, the hydroxyl groups at the ends of the main chains react with acryloyl chloride, allyl chloride, 4-vinylbenzyl chloride, epichlorophydrin, methylacryloyl chloride, propargyl chloride, or chloroacetonitrile.

It is noted that the embodiments described above are merely examples, and the polyphenylene ether oligomers of the disclosure are not limited to have the structures described above or to be formed by the methods described above. In some other embodiments, the core structure of the polyphenylene ether oligomer is derived from other compounds containing at least three hydroxyl substituted groups, such as

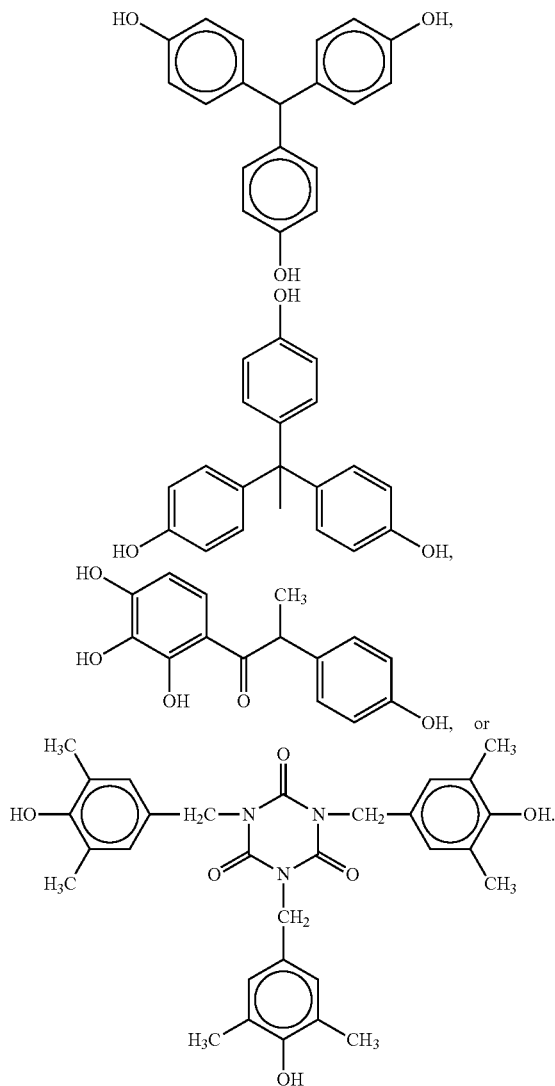

In some embodiments, the main chains of the polyphenylene ether oligomer are polymerized by other phenol-based monomers, such as phenol-based monomers containing reactive functional groups including allyl groups, methyl groups, epoxy groups, acrylic groups, or propargyl groups.

In some embodiments, the polyphenylene ether oligomer is formed by one-step polymerization. Therefore, the formation of the polyphenylene ether oligomer consumes less time, and the cost is also reduced. In addition, an use of halogen may not be required during the forming process. Furthermore, degree of polymerization and molecular weight of the polyphenylene ether oligomer may be controlled as desire by adjusting the reaction time and composition of the solvent used in the reaction.

The polyphenylene ether oligomer of the disclosure has a branch structure, and therefore the solubility of the polyphenylene ether oligomer is improved, compared to the linear structure having poor solubility.

In some embodiments, by adjusting the ratio between the phenol-based compounds and the end groups bonded to the ends of the main chains, the rate of the reactive functional groups in the polyphenylene ether oligomer is controlled, and therefore the solubility and flowability of the polyphenylene ether oligomer can be adjusted. In some embodiments, the thermal crosslinking density is adjusted through adjusting the reactive functional groups, and therefore the flowability of the material in the subsequent curing process is improved. In addition, the polyphenylene ether oligomer with the reactive functional groups may still have low dielectric coefficient, high thermal resistance, good size stability, or low hygroscopicity.

In some embodiments, the polyphenylene ether oligomer is used, but is not limited to, to form high frequency substrates, high temperature additives, coating materials, adhesives, or the like.

COMPARATIVE EXAMPLE 1

2.7 g of copper (II) bromide (0.012 mol) was added into a double-neck flask. Next, 70.7 g of N,N-diethylamine (0.96 mol) and 600 ml of butanone (as a solvent) were also added into the double-neck flask. The mixture was heated to 50° C. and stirred for 20 minutes in an oxygen system. Afterwards, 50.4 g of the 2,6-dimethylphenol (0.41 mol), 55.7 g of 2,2', 3,3',5,5'-hexamethyl-4,4'-dihydroxybiphenyl (0.21 mol), and a little amount of hydrochloric acid were added to the flask. A great amount of methanol was used to precipitate the product, and the precipitate was filtered by its weight. The precipitate was collected and dried in oven at 50° C.

70.4 g of the dried product (0.0621 mol) was dissolved in 150 g of dichloromethane. Afterwards, 120 ml of NaOH (1N) was added to the dichloromethane to perform a chemical reaction. After the reaction, HCl was added to remove impurity and salt. Tetrahydrofuran was then added to dissolve the product and methanol was used to precipitate. The resulting product was filtered by its weight and was collected and dried at 50° C. Table 1 illustrates the synthesis condition and physical properties of the resulting polymer. Dielectric coefficient (Dk) of the resulting polymer was 2.67. Dielectric loss factor (Df) of the resulting polymer was 0.0035. Glass transition temperature (Tg) of the resulting polymer was 197° C.

EXAMPLE 1

Synthesis of Polyphenylene Ether Oligomer 1

3.42 g of copper (II) bromide (24 mmol) was added into a double-neck flask. Next, 314 ml of N,N-diethylamine (1690 mmol), 6 g of 1,3,5-trihydroxybenzene (47.5 mmol), and 500 ml of toluene (as a solvent) were also added into the double-neck flask. The mixture was heated to 50° C. and stirred for 20 minutes in an oxygen system. Afterwards, 58.1 g of the 2,6-dimethylphenol (470 mmol), 22 g of 2-allyl-6-methylphenol (96 mmol), and a little amount of hydrochloric acid were added to the flask. A great amount of methanol was used to precipitate the product, and the precipitate was filtered by its weight. The precipitate was collected and dried in oven at 50° C. to obtain the polyphenylene ether oligomer 1. The yield was 52%. Table 1 illustrates the synthesis condition and physical properties of the polyphenylene ether oligomer 1. Dielectric coefficient (Dk) of the polyphenylene ether oligomer 1 was 3.05. Dielectric loss factor (Df) of the polyphenylene ether oligomer 1 was 0.004. Glass transition temperature (Tg) of the polyphenylene ether oligomer 1 was 196° C. The reaction can be illustrated by the following equation:

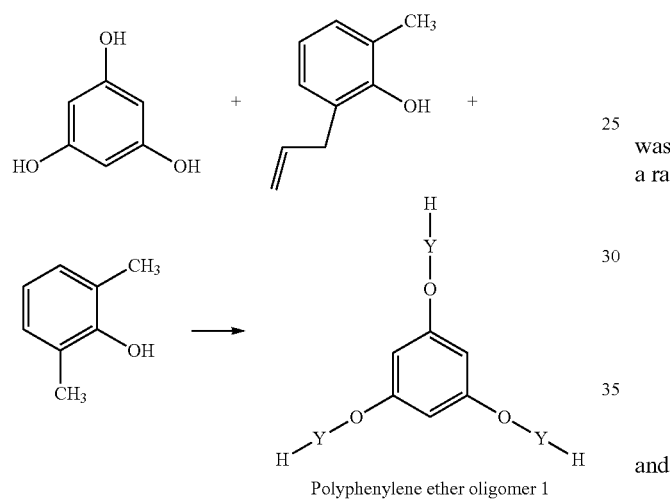
Polyphenylene ether oligomer 1

In the equation illustrated above, each of the main chains Y may have the same or different moieties. For polyphenylene ether oligomer 1, Y had repeat units

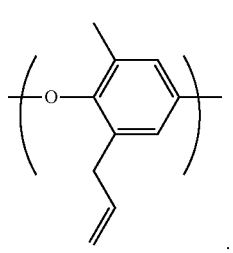

and

The number of

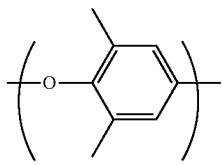

was i, and i was a positive integral. The number of

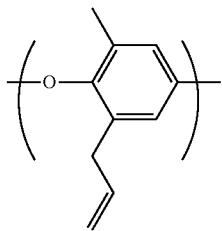

was j, and j was a positive integral. The sum of i and j was in a range of about 6 to about 300. In addition, repeat units

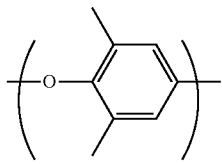

and

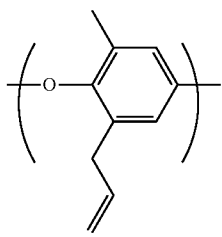

were arranged in an irregular or intermittent order. More specifically, Y was bonded to the oxygen moieties of the core structure

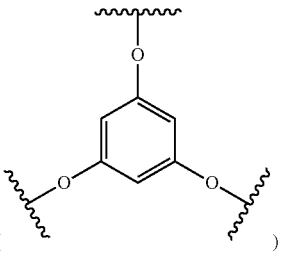

through the carbons in the benzene ring of the repeat units

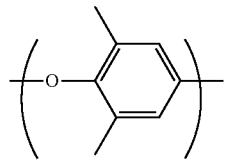

and

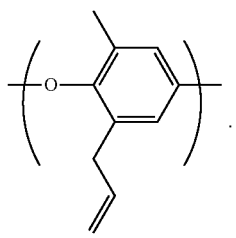

In addition, the oxygen moiety of the terminal repeat unit

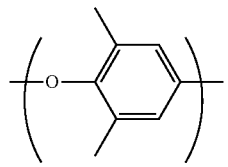

or

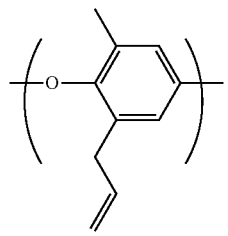

was bonded to hydrogen.

Figure 2:
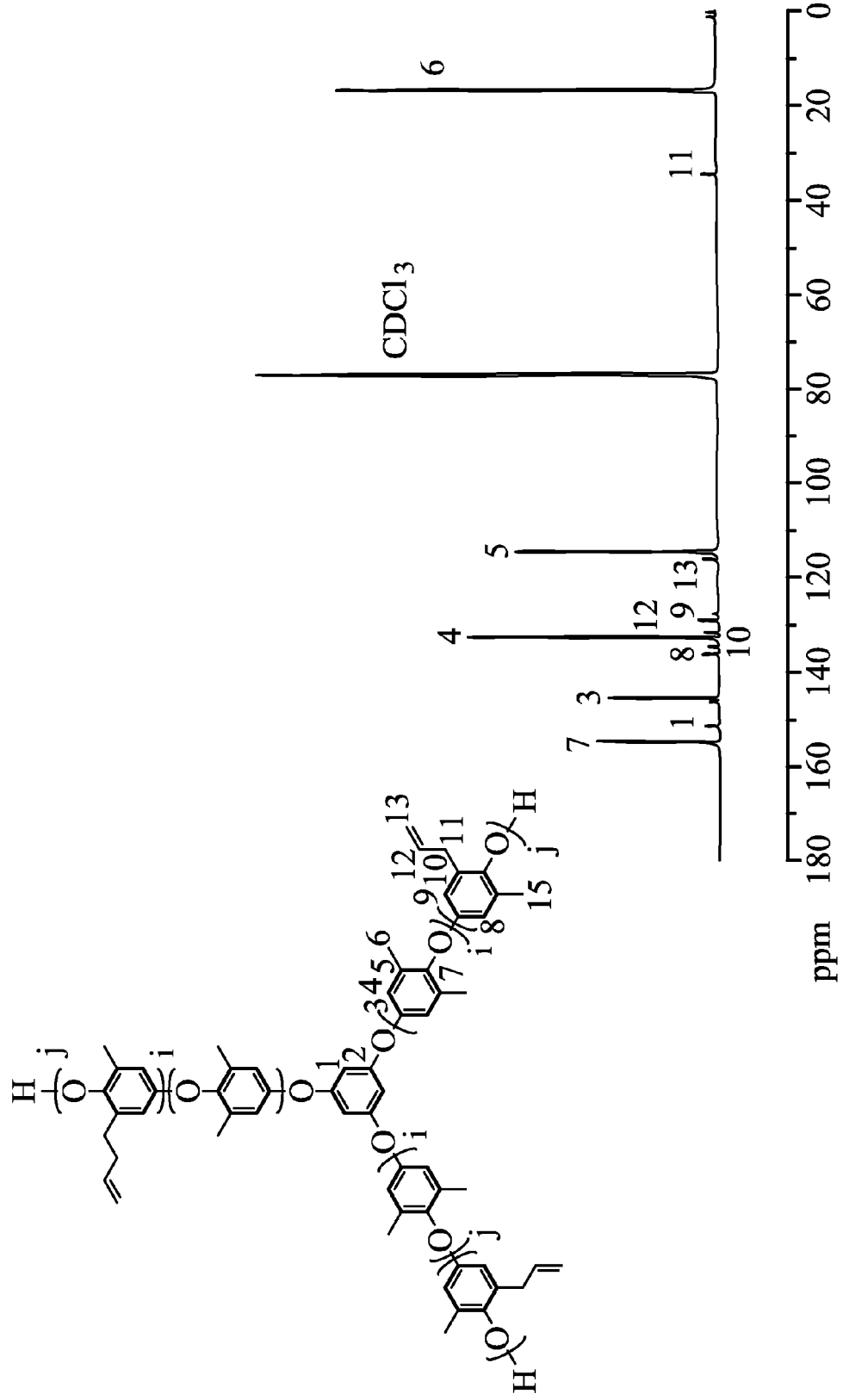
FIG. 2 illustrates the $^{13}$C-NMR spectrum of the polyphenylene ether oligomer 1 prepared from Example 1.

FIGS. 1 and 2 illustrate the NMR spectra of the polyphenylene ether oligomer 1 and are assigned as follow: $^1$H NMR: δ 7.08 ppm (1), δ 6.5 ppm (4), 5.86 ppm (12), 5.01 ppm (13), 3.24 ppm (6); $^{13}$C NMR: δ 154 ppm (7), δ 150.8 ppm (1), δ 145.3 ppm (3), 136.6 ppm (8), 134.8 ppm (10), 133.5 ppm (4), 131.7 ppm (12), 128.8 ppm (9), 115.9 ppm (13), 114.2 ppm (5), 34.4 ppm (11), and 16.8 ppm (6). In the spectrum (solvent: CDCl$_3$; δ 7.24 ppm), signals of δ=2.1 ppm and δ=6.5 ppm represent the hydrogens on methyl and benzyl respectively. The allyl group is shown by the signals at δ=5.86 ppm (12), 5.01 ppm (13), and 3.24 ppm (1).

Figure 3:
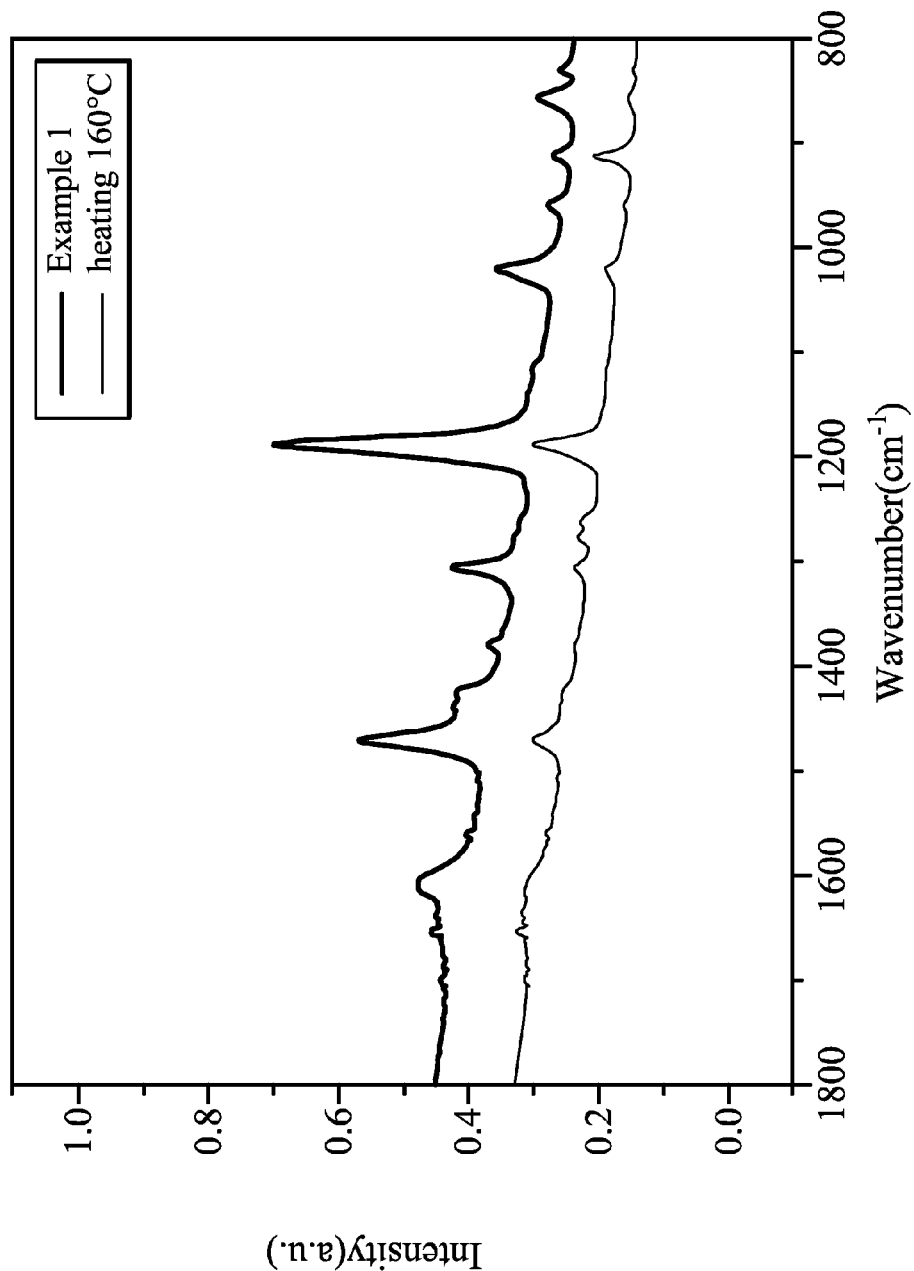
FIG. 3 illustrates the FT-IR spectrum of the polyphenylene ether oligomer 1 prepared from Example 1.

FIG. 3 illustrates the FT-IR spectrum of the polyphenylene ether oligomer 1. As shown in FIG. 3, the vinyl group of the repeat unit

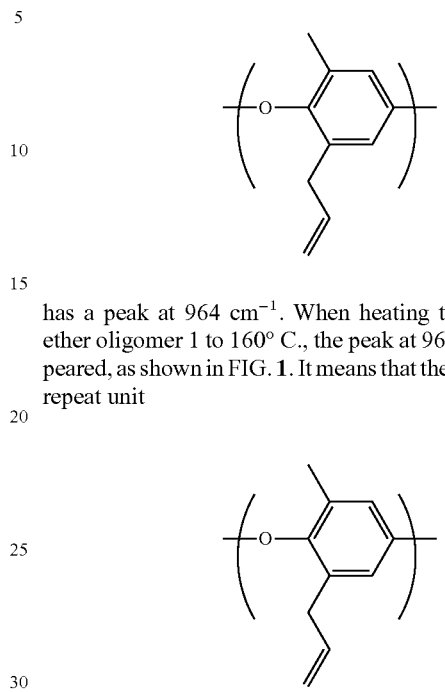

has a peak at 964 cm$^{-1}$. When heating the polyphenylene ether oligomer 1 to 160° C., the peak at 964 cm$^{-1}$ was disappeared, as shown in FIG. 1. It means that the vinyl group of the repeat unit of the polyphenylene ether oligomer undergoes a thermal crosslinking reaction and is consumed.

In addition, the polyphenylene ether oligomer 1 was analyzed by Gel Permeation Chromatography (GPC), and number-average molecular weight (Mn) of the polyphenylene ether oligomer 1 was about 5003 and polydispersity (DPI) was about 1.98.

EXAMPLE 2

Synthesis of Polyphenylene Ether Oligomer 2

3.42 g of copper (II) bromide (24 mmol) was added into a double-neck flask. Next, 314 ml of N,N-diethylamine (1690 mmol), 6 g of 1,3,5-trihydroxybenzene (47.5 mmol), and 500 ml of toluene (as a solvent) were also added into the double-neck flask. The mixture was heated to 50° C. and stirred for 20 minutes in an oxygen system. Afterwards, 58.1 g of the 2,6-dimethylphenol (470 mmol), 22 g of 2-allyl-6-methylphenol (96 mmol), and a little amount of hydrochloric acid were added to the flask. A great amount of methanol was used to precipitate the product, and the precipitate was filtered by its weight. The precipitate was collected and dried in oven at 50° C., obtaining a polyphenylene ether oligomer.

10 g of epichlorohydrin (100 mmol) and 1 g of the resulting polyphenylene ether oligomer (0.154 mmol) were put into another double-neck flask to modify the ends of the main chains. The mixture was heated to 60° C. in a nitrogen system. Next, 1 g of 2-methoxyethanol (13 mmol) was added into the flask. The mixture was distilled under vacuum to remove the solvent. Tetrahydrofuran was then added to dissolve the product and methanol was used to precipitate. The resulting product was filtered by its weight and was collected and dried at 50° C. to obtain the polyphenylene ether oligomer 2. Table 1 illustrates the synthesis condition and physical properties of the polyphenylene ether oligomer 2. Dielectric coefficient (Dk) of the polyphenylene ether oligomer 2 was 2.91. Dielectric loss factor (Df) of the polyphenylene ether oligomer 2 was 0.005. Glass transition temperature (Tg) of the polyphenylene ether oligomer 2 was 190° C. The reaction can be illustrated by the following equation:

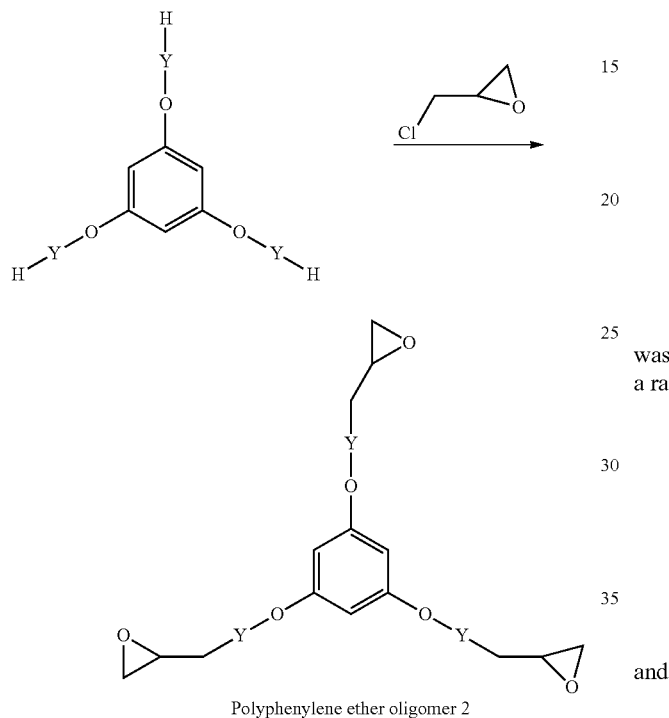

Polyphenylene ether oligomer 2

In the equation illustrated above, each of the main chains Y may have the same or different moieties. For polyphenylene ether oligomer 2, Y had repeat units

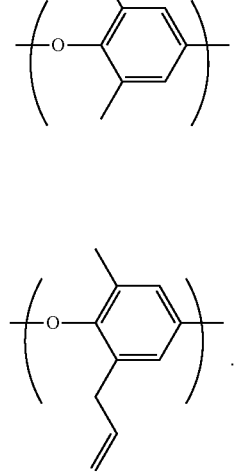

and

The number of

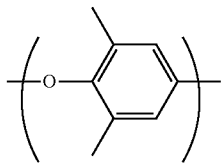

was i, and i was a positive integral. The number of

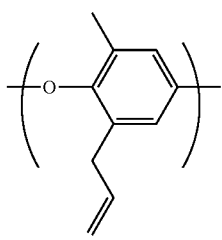

was j, and j was a positive integral. The sum of i and j was in a range of about 6 to about 300. In addition, repeat units

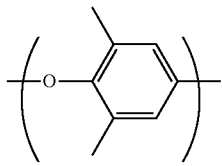

and

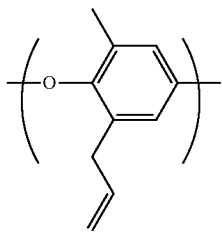

were arranged in an irregular or intermittent order. More specifically, Y was bonded to the oxygen moieties of the core structure

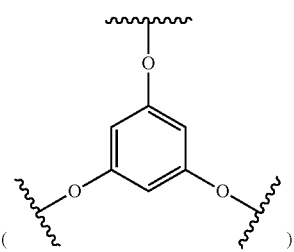 [SMILES: *Oc1cc(O*)cc(O*)c1]

through the carbons in the benzene ring of the repeat units

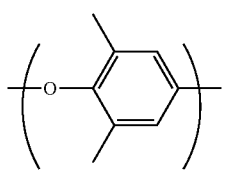

and

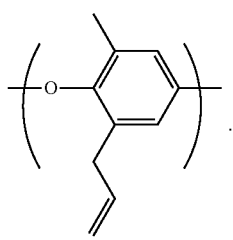

In addition, the oxygen moiety of the terminal repeat unit

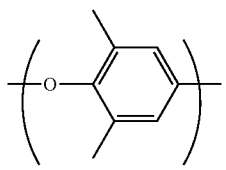

or

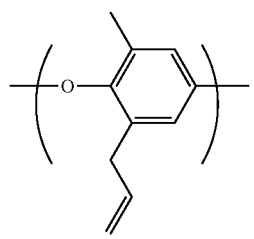

was bonded to the epoxy propyl group.

Figure 4:
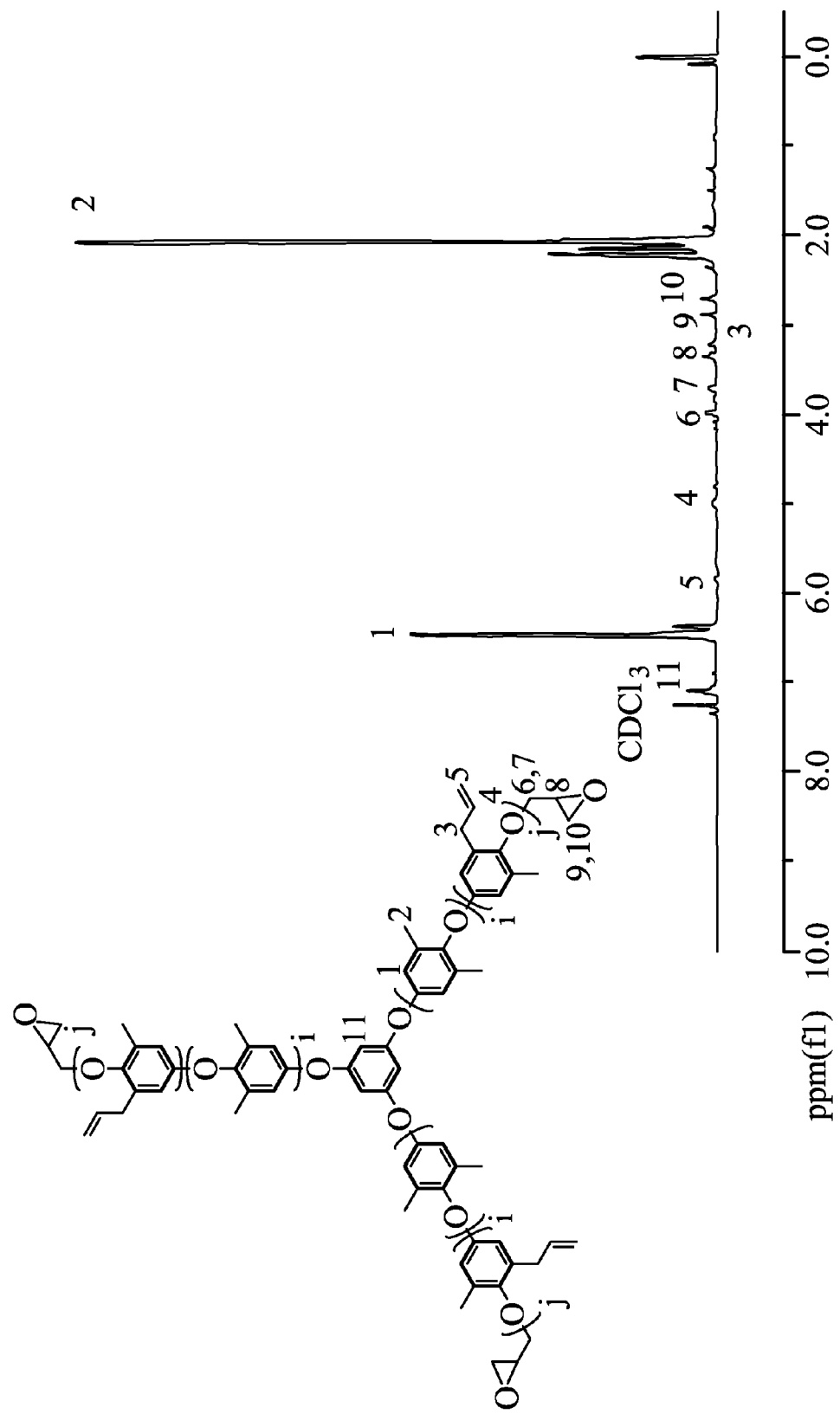
FIG. 4 illustrates the $^1$H-NMR spectrum of the polyphenylene ether oligomer 2 prepared from Example 2.

FIG. 4 illustrates the $^1$H NMR spectrum of the polyphenylene ether oligomer 2 and the results are assigned as follow: δ 2.0 ppm (2), δ 2.72 ppm (10), δ2.81 ppm (9), δ3.20 ppm (3), δ3.28 ppm (8), δ3.72 ppm (7), δ3.96 ppm (6), δ4.95 ppm (4), δ5.82 ppm (5), δ6.38 ppm (1), and δ7.08 ppm (11).

In addition, the polyphenylene ether oligomer 2 was analyzed by Gel Permeation Chromatography (GPC), and number-average molecular weight (Mn) of the polyphenylene ether oligomer 2 was about 6520 and polydispersity (DPI) was about 1.91.

A viscometer (Kapillar-viskosimeter; Cannon; No. J185 75) was used to analyze the products of Example 1, Example 2, and Comparative Example 1. The constant temperature was 30° C. and the solvent was toluene.

Figure 5:
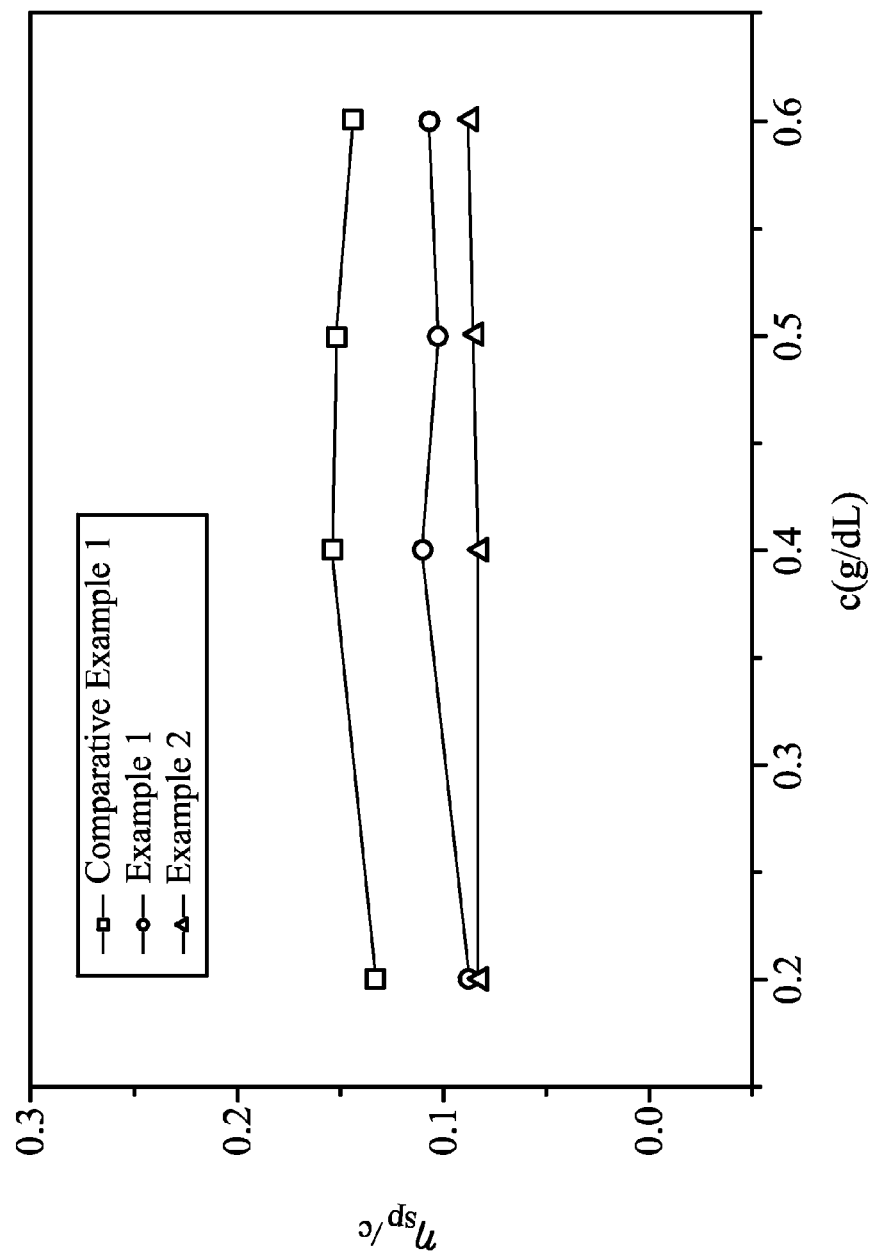
FIG. 5 illustrates viscosity-concentration profiles of the polyphenylene ether oligomers prepared from Examples 1-2 and Comparative Example 1.

As shown in FIG. 5, under the same molecular weight, the viscosity of the product of Comparative Example 1 was much larger than that of the Example 1 and Example 2. In other words, the solubility, and therefore the flowability, of the polyphenylene ether oligomers 1 and 2 were improved by having branched side chains.

TABLE 1

| | Catalyst system | Mn | PDI | Tg (° C.) | Dk (1 MHz) | Df (1 MHz) |
|---|---|---|---|---|---|---|
| Comparative Example 1 | copper (II) bromide/N,N-diethylamine (5.3%) | 4987 | — | 197 | 3.19 (1 MHz) | 0.009 (1 MHz) |
| Example 1 | copper (II) bromide/N,N-diethylamine (5%) | 5003 | 1.89 | 196 | 3.05 (1 MHz) | 0.004 (1 MHz) |
| Example 2 | copper (II) bromide/N,N-diethylamine (5%) | 6572 | 1.91 | 190 | 2.91 (1 MHz) | 0.005 (1 MHz) |

EXAMPLE 3

Synthesis of Polyphenylene Ether Oligomer 3

3.42 g of copper (II) bromide (24 mmol) was added into a double-neck flask. Next, 314 ml of N,N-diethylamine (1690 mmol), 6 g of 1,3,5-trihydroxybenzene (47.5 mmol), and 500 ml of toluene (as a solvent) were also added into the double-neck flask. The mixture was heated to 50° C. and stirred for 20 minutes in an oxygen system. Afterwards, 58.1 g of the 2,6-dimethylphenol (470 mmol), 22 g of 2-allyl-6-methylphenol (96 mmol), and a little amount of hydrochloric acid were added to the flask. A great amount of methanol was used to precipitate the product, and the precipitate was filtered by its weight. The precipitate was collected and dried in oven at 50° C. to obtain the polyphenylene ether oligomer.

1 g of the resulting polyphenylene ether oligomer (0.154 mmol) and 10 ml of THF were put into another double-neck flask. The mixture was heated to 60° C. in a nitrogen system. Next, 0.2 g NaOH (aq) (concentration: 50%) was added into the flask, and 0.8 ml of 4-chloromethylstyrene (1.1 mmol) was added into the flask slowly afterwards. After the reaction was completed, impurity such as salt was washed by distilled water. THF was then added to dissolve the product and methanol was used to precipitate. The resulting product was filtered by its weight and was collected and dried at 50° C. to obtain the polyphenylene ether oligomer 3. The reaction can be illustrated by the following equation:

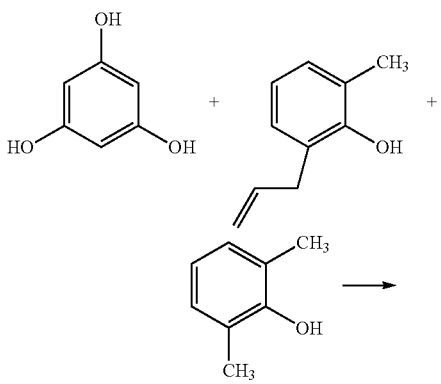

-continued

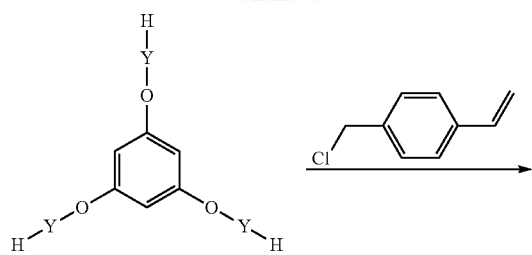

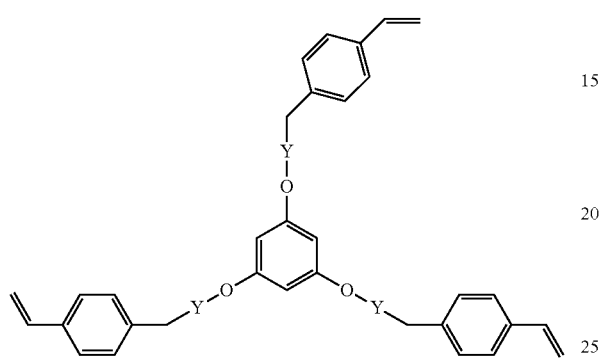

Polyphenylene ether oligomer 3

In the equation illustrated above, each of the main chains Y may have the same or different moieties. For polyphenylene ether oligomer 3, Y had repeat units

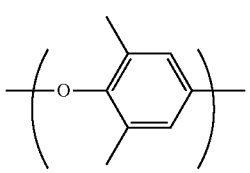

and

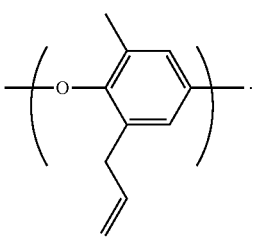

The number of

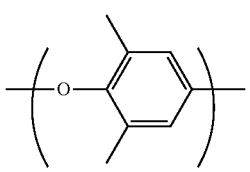

was i, and i was a positive integral. The number of

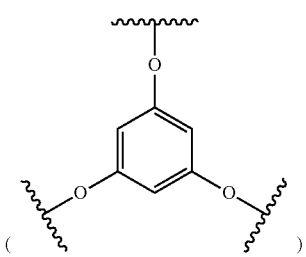 [SMILES: *Oc1cc(O*)cc(O*)c1]

was j, and j was a positive integral. The sum of i and j was in a range of about 6 to about 300. In addition, repeat units

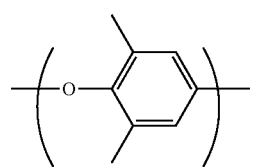

and

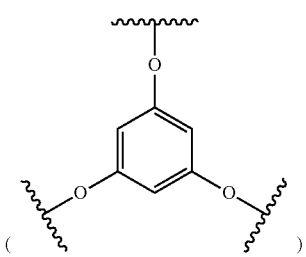 [SMILES: *Oc1cc(O*)cc(O*)c1]

were arranged in an irregular or intermittent order. More specifically, Y was bonded to the oxygen moieties of the core structure

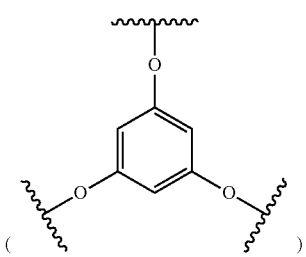 [SMILES: *Oc1cc(O*)cc(O*)c1]

through the carbons in the benzene ring of the repeat units

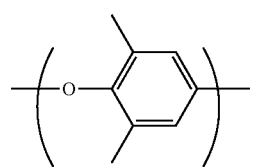

and

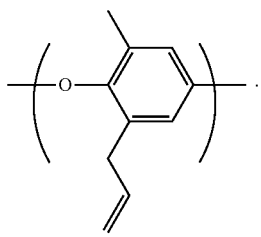

In addition, the oxygen moiety of the terminal repeat unit

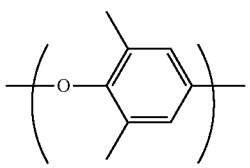

or

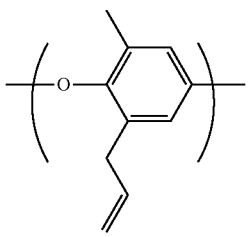

was bonded to the vinylbenzyl group.

Figure 6:
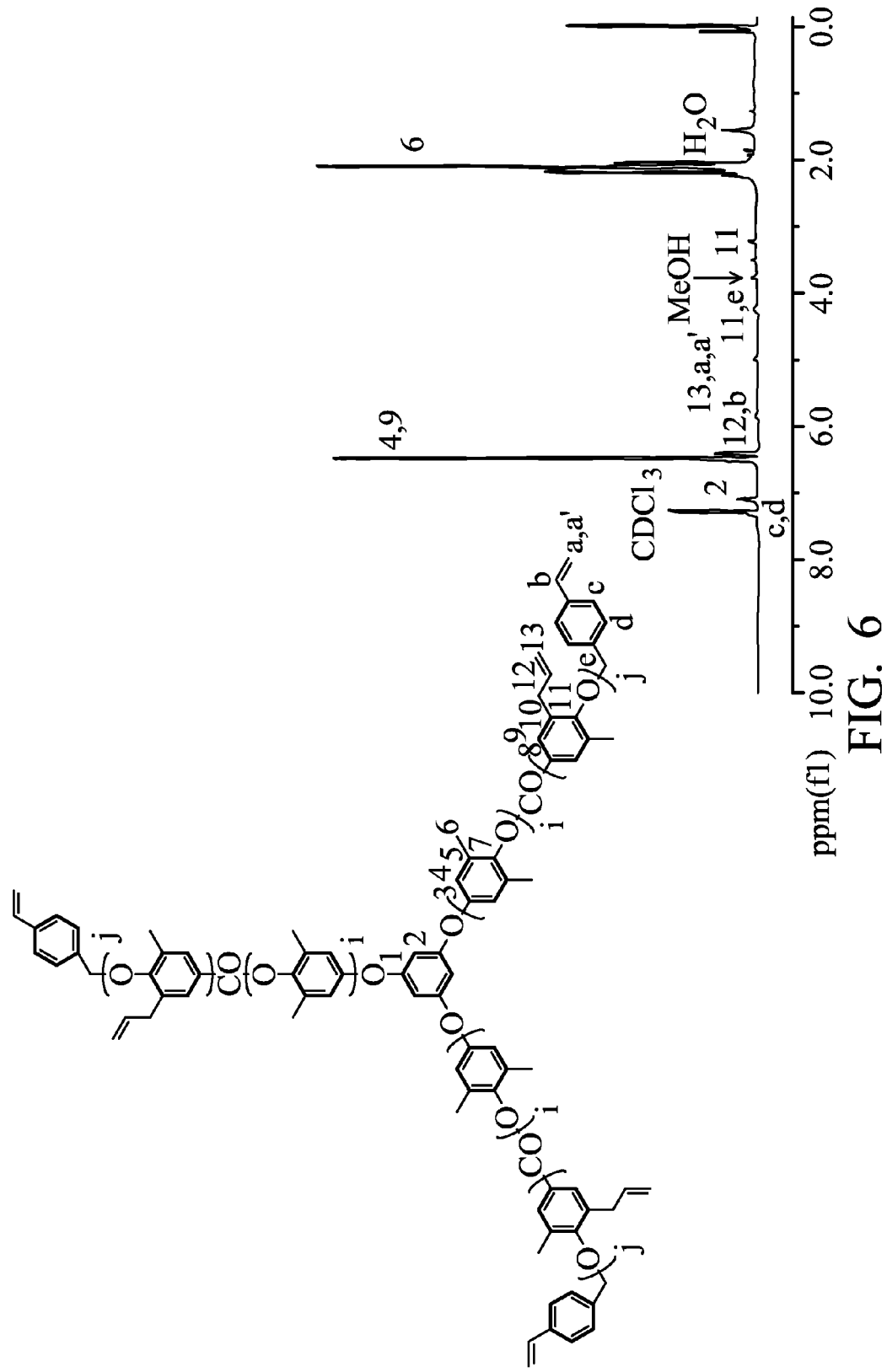
FIG. 6 illustrates the $^1$H-NMR spectrum of the polyphenylene ether oligomer 3 prepared from Example 3.

FIG. 6 illustrates the $^1$H NMR spectrum of the polyphenylene ether oligomer 3 and the results are assigned as follow: δ 2.72 ppm (6), δ3.28, δ 4.32 ppm (11), δ4.32 ppm (e), δ4.98 ppm (a,a'), δ5.86 ppm (12,b), δ6.38 ppm (4,9), δ7.08 ppm (2), and δ7.38 ppm (c,d).

In addition, the polyphenylene ether oligomer 3 was analyzed by Gel Permeation Chromatography (GPC), and number-average molecular weight (Mn) of the polyphenylene ether oligomer 3 was about 6579 and polydispersity (DPI) was about 1.91.

EXAMPLE 4

Synthesis of Polyphenylene Ether Oligomer 4

3.42 g of copper (II) bromide (24 mmol) was added into a double-neck flask. Next, 314 ml of N,N-diethylamine (1690 mmol), 6 g of 1,3,5-trihydroxybenzene (47.5 mmol), and 500 ml of toluene (as a solvent) were also added into the double-neck flask. The mixture was heated to 50° C. and stirred for 20 minutes in an oxygen system. Afterwards, 58.1 g of the 2,6-dimethylphenol (470 mmol), 22 g of 2-allyl-6-methylphenol (96 mmol), and a little amount of hydrochloric acid were added to the flask. A great amount of methanol was used to precipitate the product, and the precipitate was filtered by its weight. The precipitate was collected and dried in oven at 50° C. to obtain the polyphenylene ether oligomer.

1 g of the resulting polyphenylene ether oligomer (0.154 mmol) and 10 ml of THF (as a solvent) were added into another double-neck flask. The mixture was heated to 60° C. in a nitrogen system. Next, 0.2 g NaOH (aq) (concentration: 50%) was added into the flask, and 0.8 ml of methacryloyl chloride (7 mmol) was added into the flask slowly afterwards. After the reaction was completed, impurity such as salt was washed by distilled water. THF was then added to dissolve the product and methanol was used to precipitate. The resulting product was filtered by its weight and was collected and dried at 50° C. to obtain the polyphenylene ether oligomer 4. The reaction can be illustrated by the following equation:

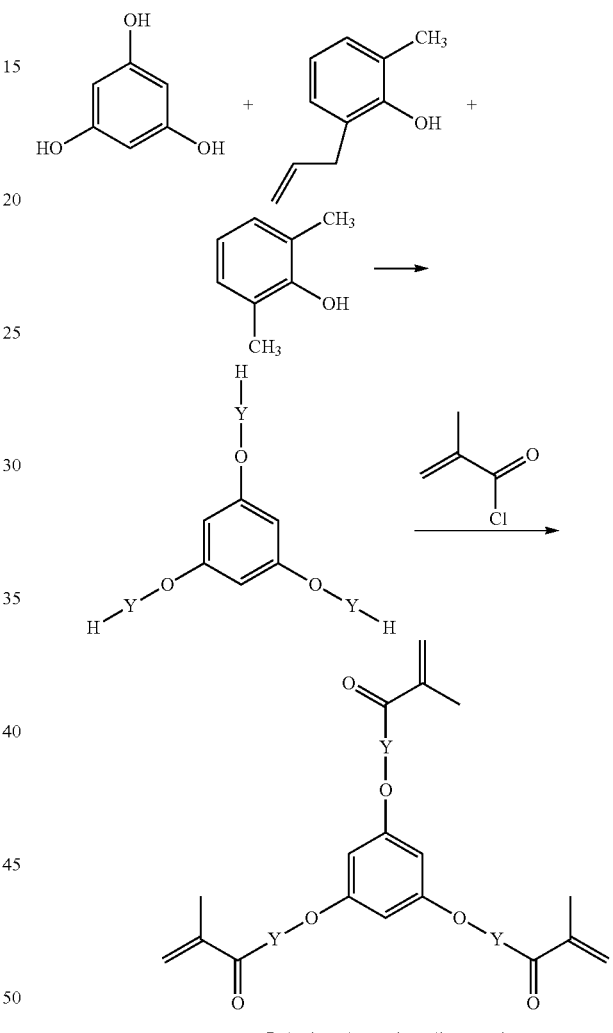

Polyphenylene ether oligomer 4

In the equation illustrated above, each of the main chains Y may have the same or different moieties. For polyphenylene ether oligomer 4, Y had repeat units

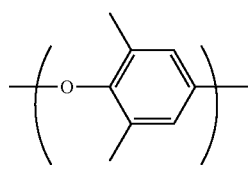

and

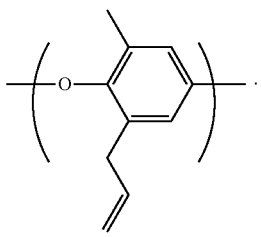

The number of

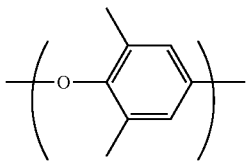

was i, and i was a positive integral. The number of

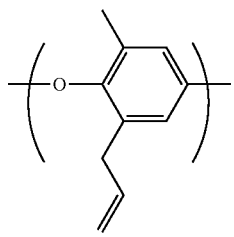

was j, and j was a positive integral. The sum of i and j was in a range of about 6 to about 300. In addition, repeat units

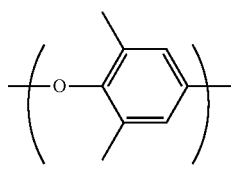

and

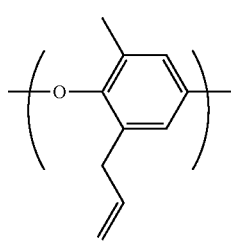

were arranged in an irregular or intermittent order. More specifically, Y was bonded to the oxygen moieties of the core structure

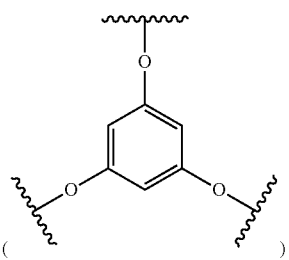 [SMILES: *Oc1cc(O*)cc(O*)c1]

through the carbons in the benzene ring of the repeat units

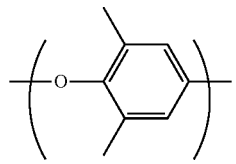

and

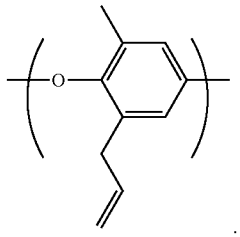

In addition, the oxygen moiety of the terminal repeat unit

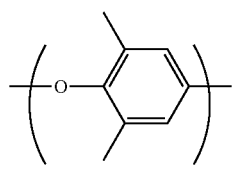

or

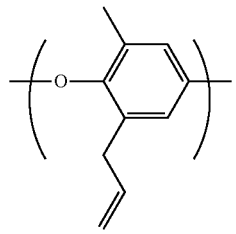

was bonded to the methacryloyl group.

Figure 7:
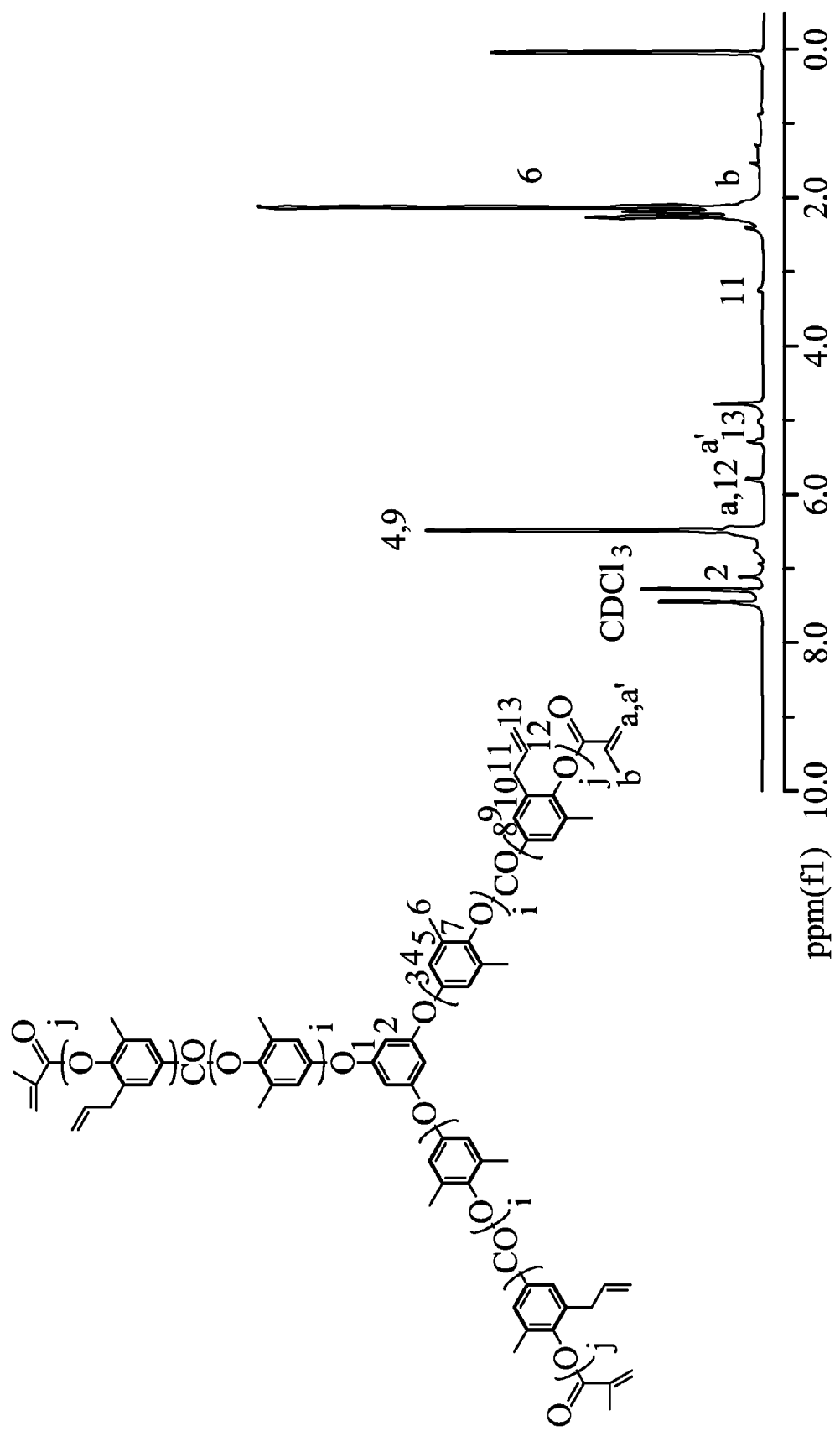
FIG. 7 illustrates the $^1$H-NMR spectrum of the polyphenylene ether oligomer 4 prepared from Example 4.

FIG. 7 illustrates the $^1$H NMR spectrum of the polyphenylene ether oligomer 4 and the results are assigned as follow: δ1.92 ppm (b), δ2.18 ppm (6), δ3.26 ppm (11), δ 4.98 ppm (13), δ 5.24 ppm (a'), δ5.76 ppm (a,b), δ6.32 ppm (4,9), and δ 7.08 ppm (2).

In addition, the polyphenylene ether oligomer 4 was analyzed by Gel Permeation Chromatography (GPC), and number-average molecular weight (Mn) of the polyphenylene ether oligomer 4 was about 6535 and polydispersity (DPI) was about 1.91.

EXAMPLE 5

Synthesis of Polyphenylene Ether Oligomer 5

3.42 g of copper (II) bromide (24 mmol) was added into a double-neck flask. Next, 70.7 g of N,N-diethylamine (0.96 mol), 14 g of 1,1,1-Tris(4-hydroxyphenyl)ethane (47.5 mmol), and 500 ml of toluene (as a solvent) were also added into the double-neck flask. The mixture was heated to 50° C. and stirred for 20 minutes in an oxygen system. Afterwards, 58.1 g of the 2,6-dimethylphenol (470 mmol), 22 g of 2-allyl-6-methylphenol (96 mmol), and a little amount of hydrochloric acid were added to the flask. A great amount of methanol was used to precipitate the product, and the precipitate was filtered by its weight. The precipitate was collected and dried in oven at 50° C. to obtain the polyphenylene ether oligomer.

1 g of the resulting polyphenylene ether oligomer (0.154 mmol) and 10 ml of THF (as a solvent) were added into another double-neck flask. The mixture was heated to 60° C. in a nitrogen system. Next, 0.2 g NaOH (aq) (concentration: 50%) was added into the flask, and 0.8 ml of 4-Vinylbenzyl chloride (1.1 mmol) was added into the flask slowly afterwards. After the reaction was completed, impurity such as salt was washed by distilled water. THF was then added to dissolve the product and methanol was used to precipitate. The resulting product was filtered by its weight and was collected and dried at 50° C. to obtain the polyphenylene ether oligomer 5. The reaction can be illustrated by the following equation:

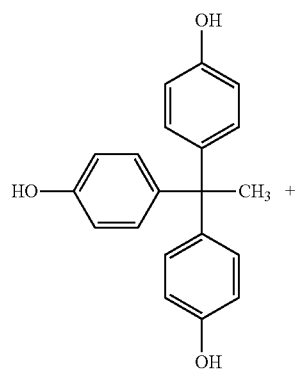

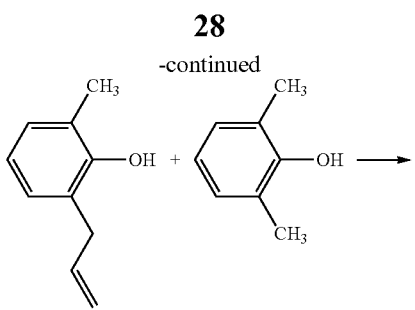

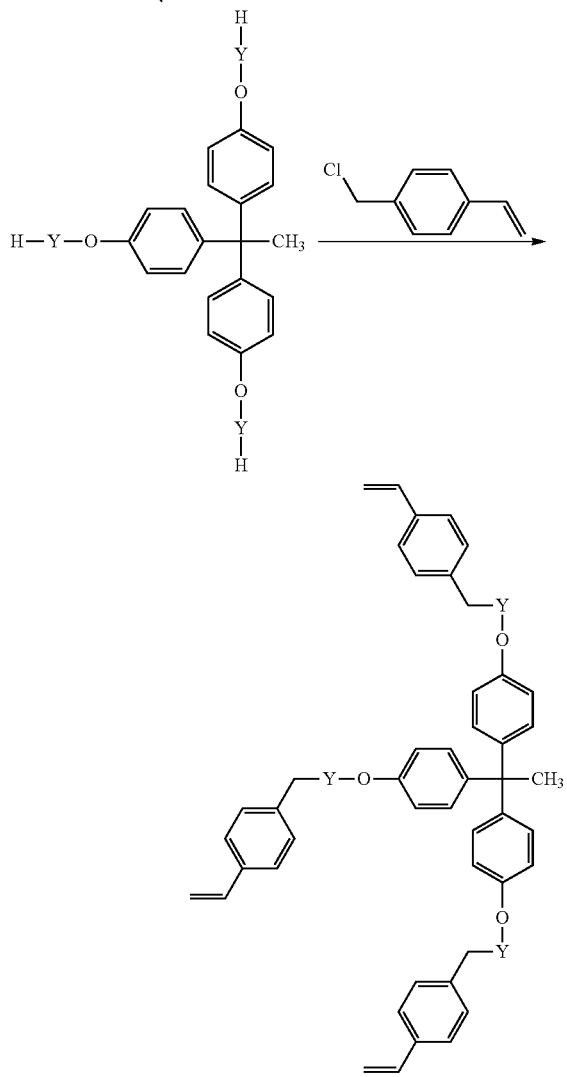

Polyphenylene ether oligomer 5

In the equation illustrated above, each of the main chains Y may have the same or different moieties. For polyphenylene ether oligomer 5, Y had repeat units

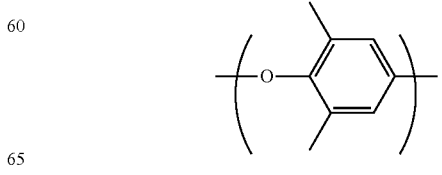

and

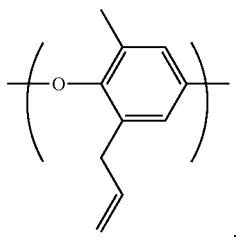

The number of

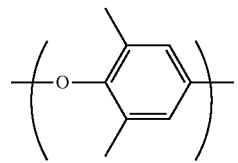

was i, and i was a positive integral. The number of

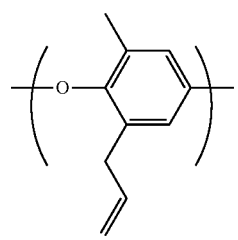

was j, and j was a positive integral. The sum of i and j was in a range of about 6 to about 300. In addition, repeat units

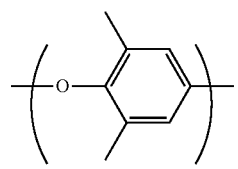

and

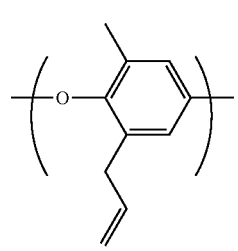

were arranged in an irregular or intermittent order. More specifically, Y was bonded to the oxygen moieties of the core structure

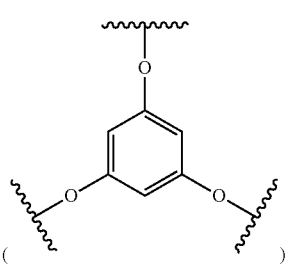 [SMILES: *Oc1cc(O*)cc(O*)c1]

through the carbons in the benzene ring of the repeat units

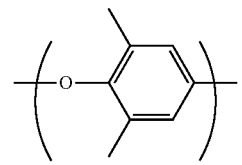

and

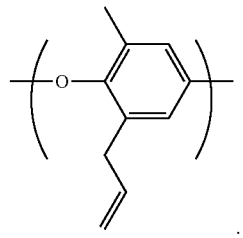

In addition, the oxygen moiety of the terminal repeat unit

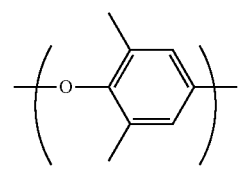

or

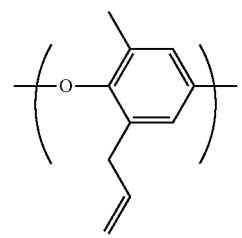

was bonded to the methylstyrene group.

Figure 8:
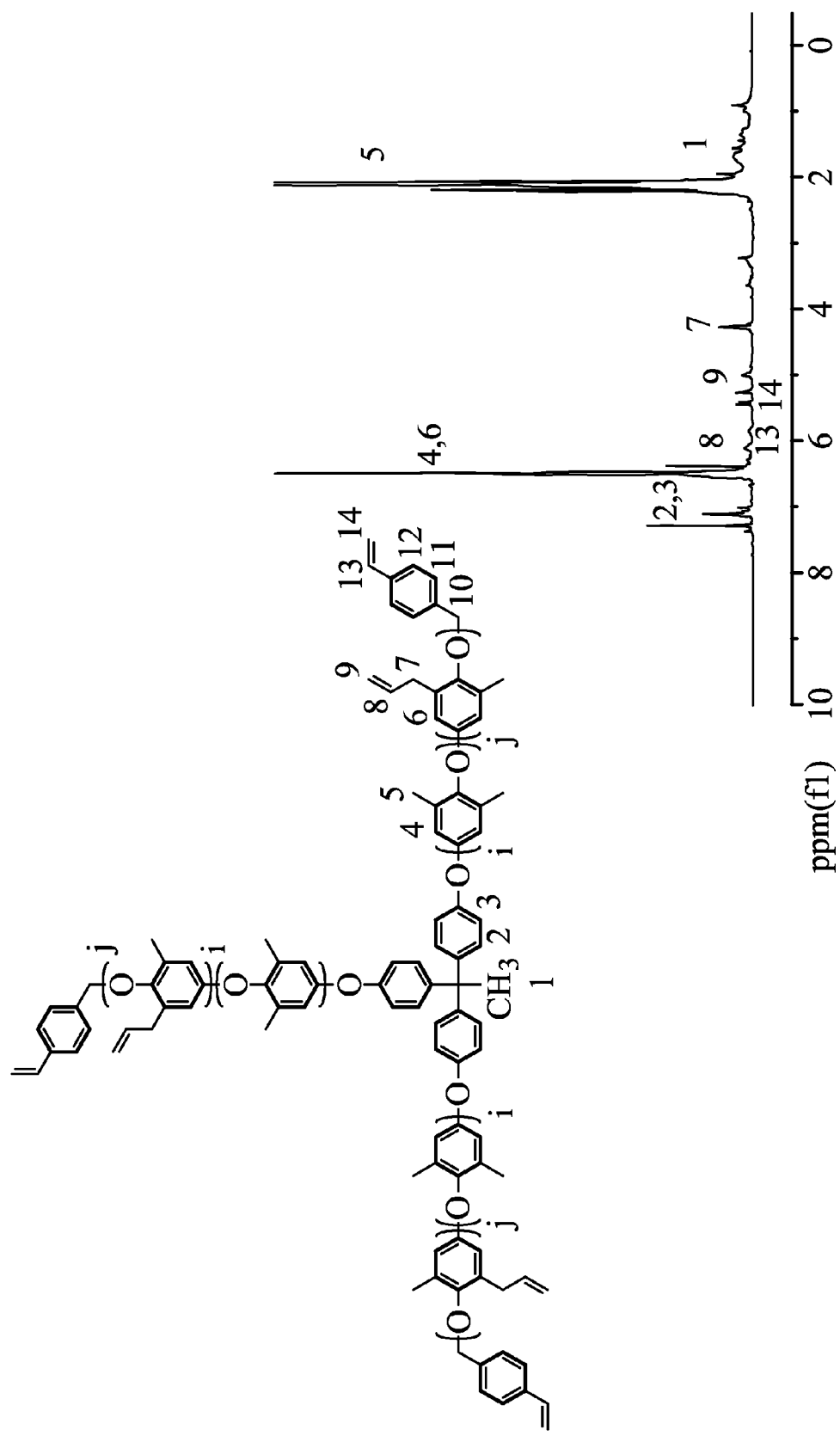
FIG. 8 illustrates the $^1$H-NMR spectrum of the polyphenylene ether oligomer 5 prepared from Example 5.

FIG. 8 illustrates the $^1$H NMR spectrum of the polyphenylene ether oligomer 5 and the results are assigned as follow: δ 1.6 ppm (1), 2.1 ppm (5), δ4.2 (7), δ 5.0 ppm (9), δ5.2 ppm (14), δ5.8 ppm (13), δ6.1 ppm (8), δ6.38 ppm (4,6), δ7.08 ppm (2,3).

In addition, the polyphenylene ether oligomer 5 was analyzed by Gel Permeation Chromatography (GPC), and number-average molecular weight (Mn) of the polyphenylene ether oligomer 5 was about 3798 and polydispersity (DPI) was about 1.36. Dielectric coefficient (Dk) of the polyphenylene ether oligomer 5 was 2.77. Dielectric loss factor (Df) of the polyphenylene ether oligomer 5 was 0.005.

EXAMPLE 6

Synthesis of Polyphenylene Ether Oligomer 6

3.42 g of copper (II) bromide (24 mmol) was added into a double-neck flask. Next, 70.7 g of N,N-diethylamine (0.96 mol), 14 g of 1,1,1-Tris(4-hydroxyphenyl)ethane (47.5 mmol), and 500 ml of toluene (as a solvent) were also added into the double-neck flask. The mixture was heated to 50° C. and stirred for 20 minutes in an oxygen system. Afterwards, 58.1 g of the 2,6-dimethylphenol (470 mmol), 22 g of 2-allyl-6-methylphenol (96 mmol), and a little amount of hydrochloric acid were added to the flask. A great amount of methanol was used to precipitate the product, and the precipitate was filtered by its weight. The precipitate was collected and dried in oven at 50° C. to obtain the polyphenylene ether oligomer.

1 g of the resulting polyphenylene ether oligomer (0.154 mmol) and 10 ml of THF (as a solvent) were added into another double-neck flask. The mixture was heated to 60° C. in a nitrogen system. Next, 0.2 g of NaOH (aq) (concentration: 50%) was added into the flask, and 0.2 ml of allyl chloride (1.1 mmol) was added into the flask slowly afterwards. After the reaction was completed, impurity such as salt was washed by distilled water. THF was then added to dissolve the product and methanol was used to precipitate. The resulting pproduct was filtered by its weight and was collected and dried at 50° C. to obtain the polyphenylene ether oligomer 6. The reaction can be illustrated by the following equation:

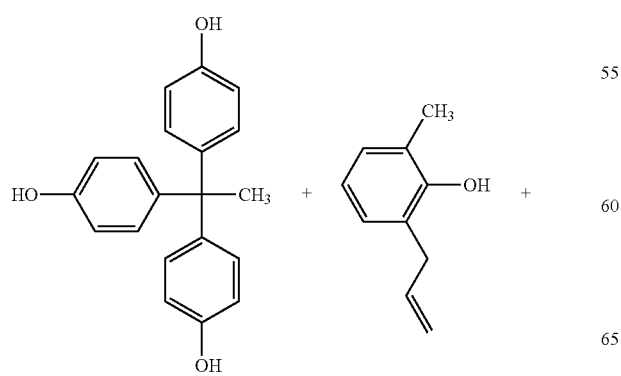

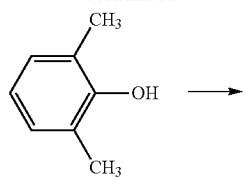

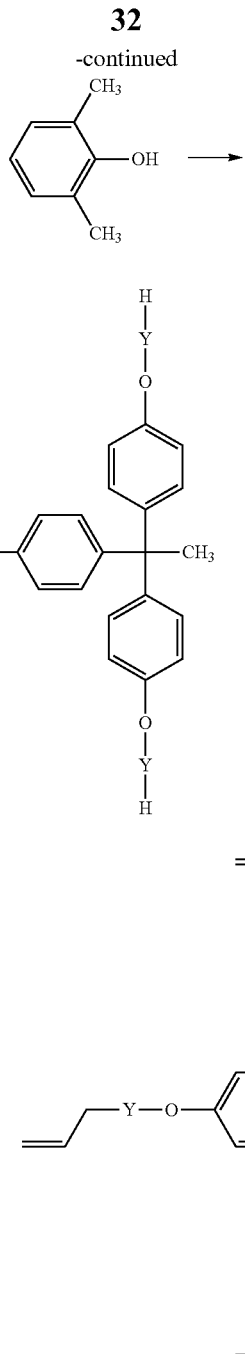

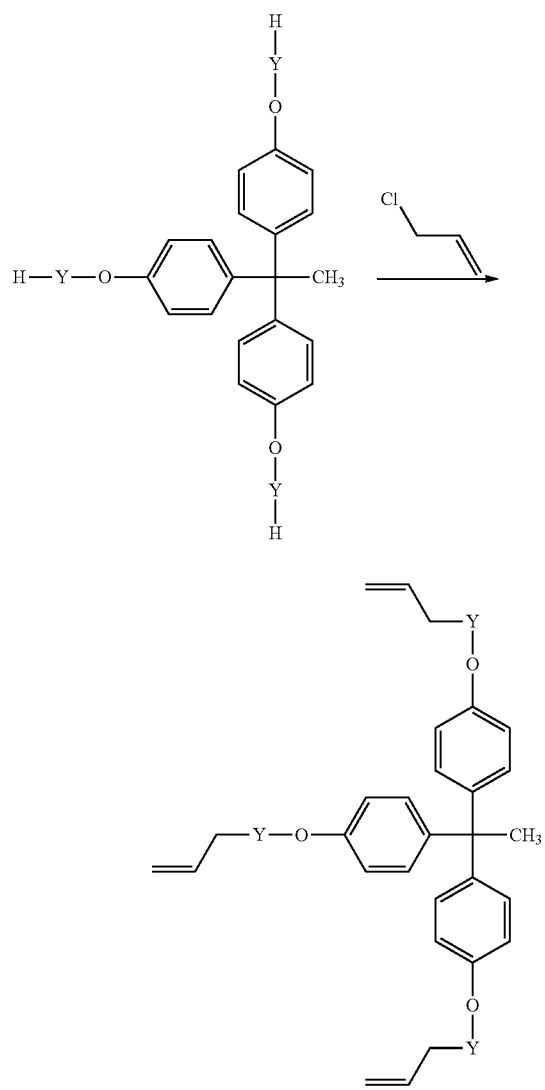

Polyphenylene ether oligomer 6

In the equation illustrated above, each of the main chains Y may have the same or different moieties. For polyphenylene ether oligomer 6, Y had repeat units

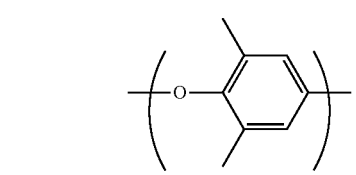

and

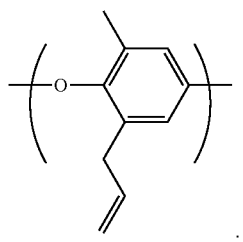

The number of

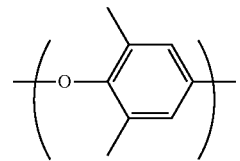

was i, and i was a positive integral. The number of

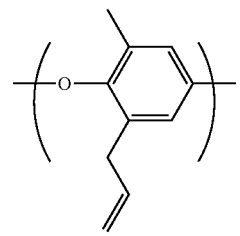

was j, and j was a positive integral. The sum of i and j was in a range of about 6 to about 300. In addition, repeat units

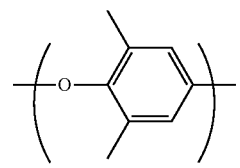

and

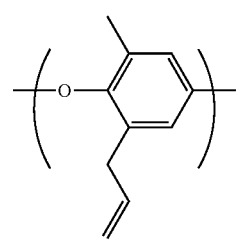

were arranged in an irregular or intermittent order. More specifically, Y was bonded to the oxygen moieties of the core structure

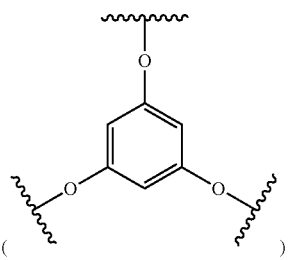 [SMILES: *Oc1cc(O*)cc(O*)c1]

through the carbons in the benzene ring of the repeat units

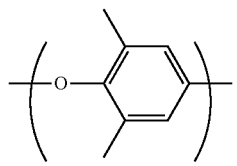

and

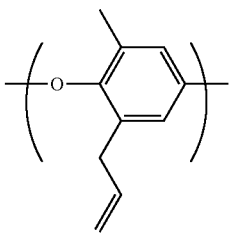

In addition, the oxygen moieties of the repeat units

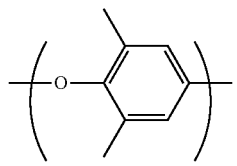

and

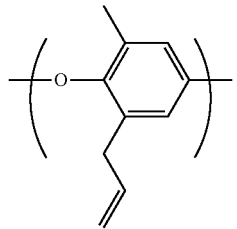

was bonded to the methacryloyl groups.

Figure 9:
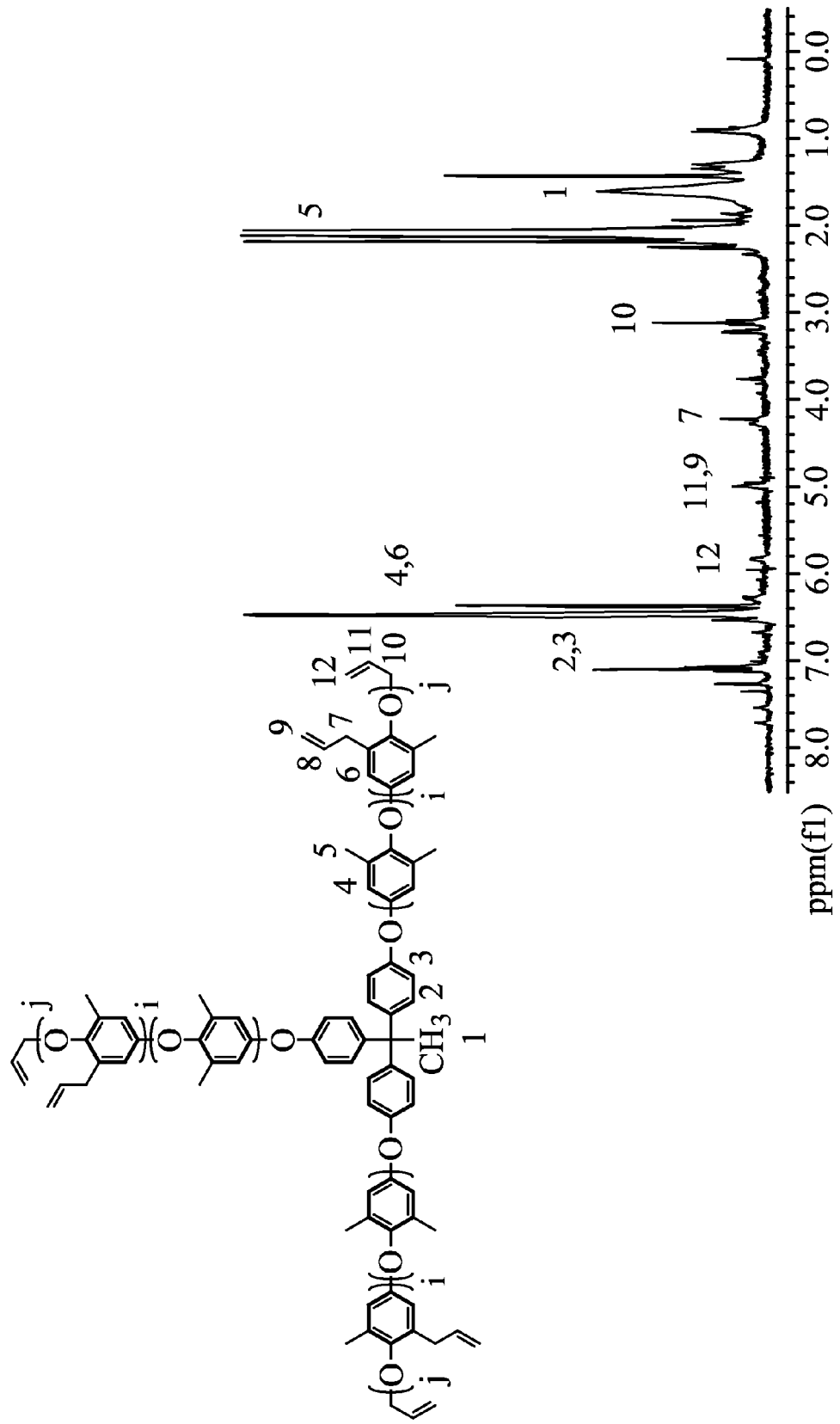
FIG. 9 illustrates the $^1$H-NMR spectrum of the polyphenylene ether oligomer prepared from Example 6.

FIG. 9 illustrates the ¹H NMR spectrum of the polyphenylene ether oligomer 6 and the results are assigned as follow: δ 1.6 ppm (1), 2.1 ppm (5), δ4.2 (7), δ 5.0 ppm (9), δ5.2 ppm (14), δ5.8 ppm (13), δ6.1 ppm (8), δ6.38 ppm (4,6), δ7.08 ppm (2,3).

In addition, the polyphenylene ether oligomer 6 was analyzed by Gel Permeation Chromatography (GPC), and number-average molecular weight (Mn) of the polyphenylene ether oligomer 6 was about 3625 and polydispersity (DPI) was about 1.36. Dielectric coefficient (Dk) of the polyphenylene ether oligomer 6 was 2.88. Dielectric loss factor (Df) of polyphenylene ether oligomer 6 was 0.006.

EXAMPLE 7

Synthesis of Polyphenylene Ether Oligomer 7

3.42 g of copper (II) bromide (24 mmol) was added into a double-neck flask. Next, 70.7 g of N,N-diethylamine (0.96 mol), 14 g of 1,1,1-Tris(4-hydroxyphenyl)ethane (47.5 mmol), and 500 ml of toluene (as a solvent) were also added into the double-neck flask. The mixture was heated to 50° C. and stirred for 20 minutes in an oxygen system. Afterwards, 58.1 g of the 2,6-dimethylphenol (470 mmol), 22 g of 2-allyl-6-methylphenol (96 mmol), and a little amount of hydrochloric acid were added to the flask. A great amount of methanol was used to precipitate the product, and the precipitate was filtered by its weight. The precipitate was collected and dried in oven at 50° C. to obtain the polyphenylene ether oligomer.

1 g of the resulting polyphenylene ether oligomer (0.154 mmol) and 10 ml of THF (as a solvent) were added into another double-neck flask. The mixture was heated to 60° C. in a nitrogen system. Next, 0.2 g of NaOH (aq) (concentration: 50%) was added into the flask, and 0.2 ml of methacryloyl chloride (1.1 mmol) was added into the flask slowly afterwards. After the reaction was completed, impurity such as salt was washed by distilled water. THF was then added to dissolve the product and methanol was used to precipitate. The resulting product was filtered by its weight and was collected and dried at 50° C. to obtain the polyphenylene ether oligomer 7. The reaction can be illustrated by the following equation:

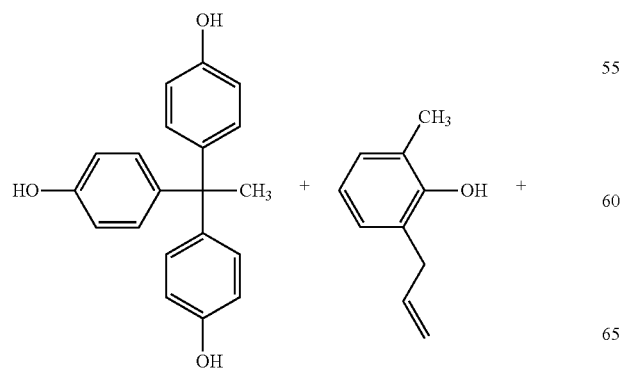

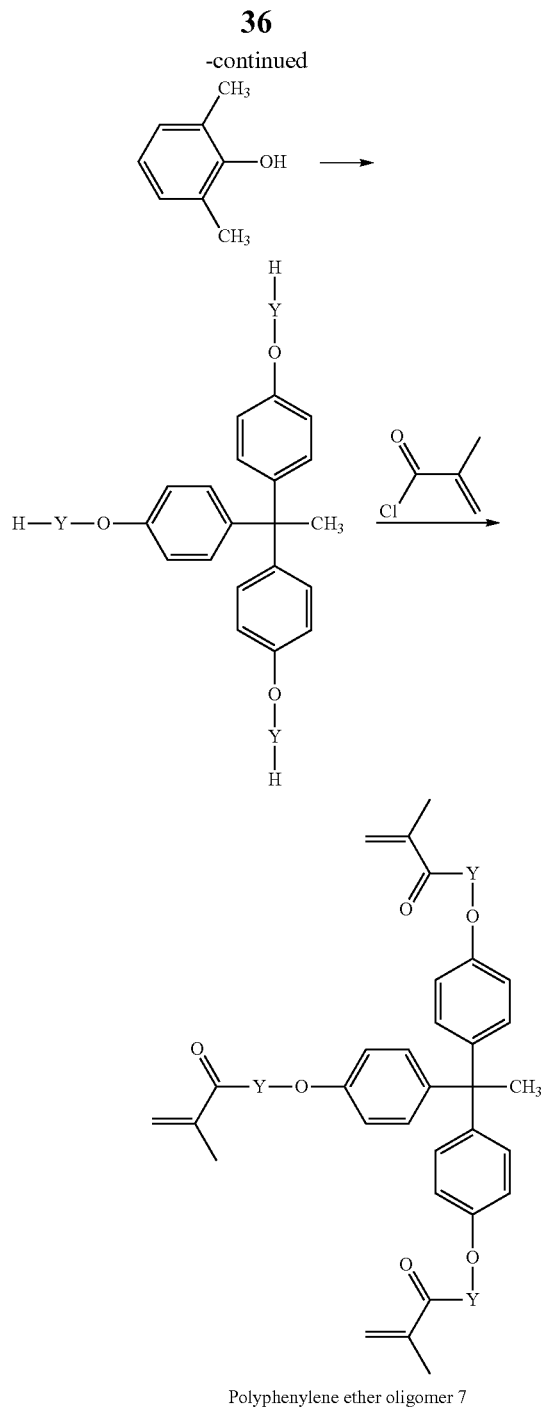

Polyphenylene ether oligomer 7

In the equation illustrated above, each of the main chains Y may have the same or different moieties. For polyphenylene ether oligomer 7, Y had repeat units

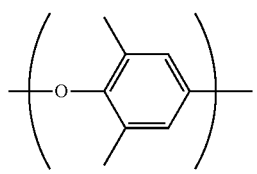

and

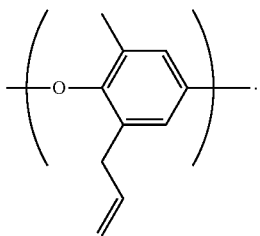

The number of

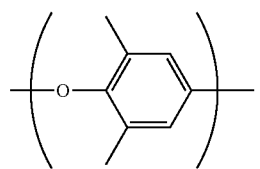

was i, and i was a positive integral. The number of

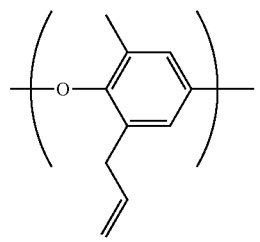

was j, and j was a positive integral. The sum of i and j was in a range of about 6 to about 300. In addition, repeat units

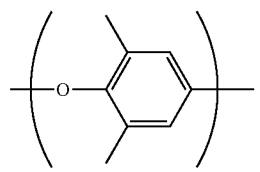

and

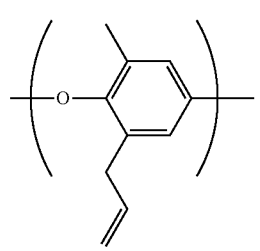

were arranged in an irregular or intermittent order. More specifically, Y was bonded to the oxygen moieties of the core structure

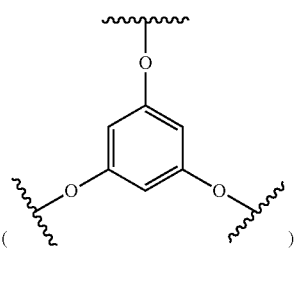 [SMILES: *Oc1cc(O*)cc(O*)c1]

through the carbons in the benzene ring of the repeat units

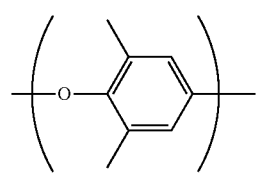

and

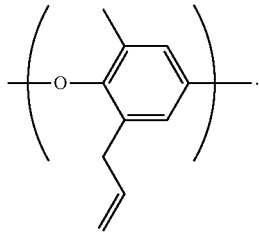

In addition, the oxygen moiety of the terminal repeat unit

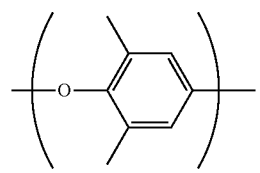

or

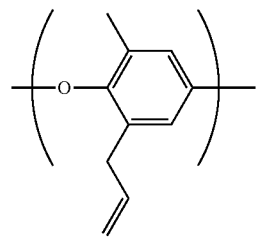

was bonded to the methacryloyl group.

Figure 10:
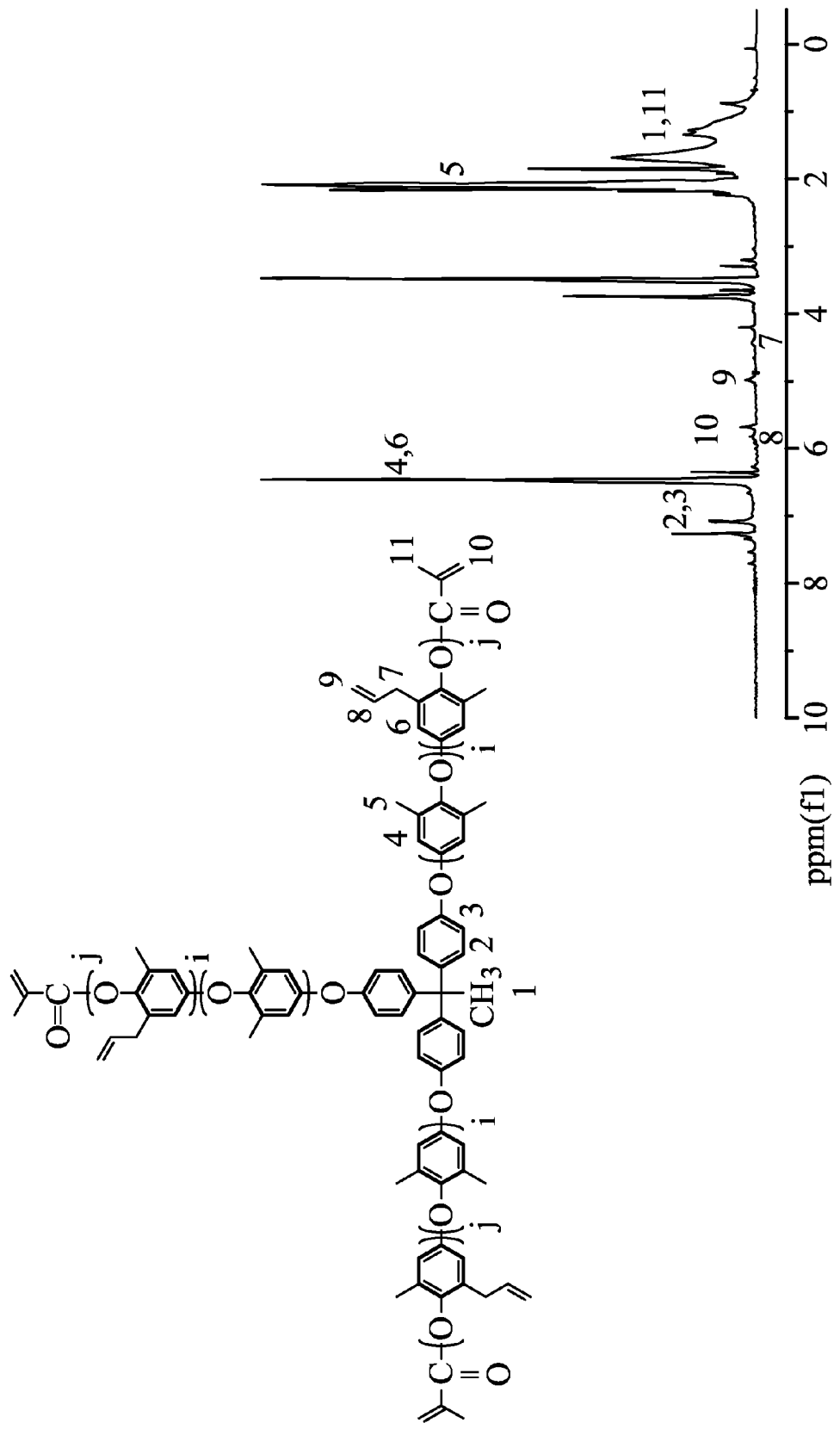
FIG. 10 illustrates the $^1$H-NMR spectrum of the polyphenylene ether oligomer prepared from Example 7.

FIG. 10 illustrates the $^1$H NMR spectrum of the polyphenylene ether oligomer 7 and the results are assigned as follow: δ1.6 ppm (1,11), δ2.18 ppm (5), δ 4.23 ppm (7), δ 5.02 ppm (9), δ5.82 ppm (10), δ5.90 ppm (8), δ6.32 ppm (4,6), δ7.08 ppm (2,3).

In addition, the polyphenylene ether oligomer 7 was analyzed by Gel Permeation Chromatography (GPC), and number-average molecular weight (Mn) of the polyphenylene ether oligomer 7 was about 3755 and polydispersity (DPI) was about 1.36.

EXAMPLE 8

Synthesis of Polyphenylene Ether Oligomer 8

3.42 g of copper (II) bromide (24 mmol) was added into a double-neck flask. Next, 70.7 g of N,N-diethylamine (0.96 mol), 14 g of 1,1,1-Tris(4-hydroxyphenyl)ethane (47.5 mmol), and 500 ml of toluene (as a solvent) were also added into the double-neck flask. The mixture was heated to 50° C. and stirred for 20 minutes in an oxygen system. Afterwards, 58.1 g of the 2,6-dimethylphenol (470 mmol), 22 g of 2-allyl-6-methylphenol (96 mmol), and a little amount of hydrochloric acid were added to the flask. A great amount of methanol was used to precipitate the product, and the precipitate was filtered by its weight. The precipitate was collected and dried in oven at 50° C. to obtain the polyphenylene ether oligomer.

10 g of epichlorohydrin (100 mmol) and 1 g of the resulting polyphenylene ether oligomer (0.154 mmol) were put into another double-neck flask to modify the ends of the main chains. The mixture was heated to 60° C. in a nitrogen system. Next, 1 g of 2-methoxyethanol (13 mmol) was added into the flask. The mixture was distilled under vacuum to remove the solvent. Tetrahydrofuran was then added to dissolve the product and methanol was used to precipitate. The resulting product was filtered by its weight and was collected and dried at 50° C. to obtain the polyphenylene ether oligomer 8. The reaction can be illustrated by the following equation:

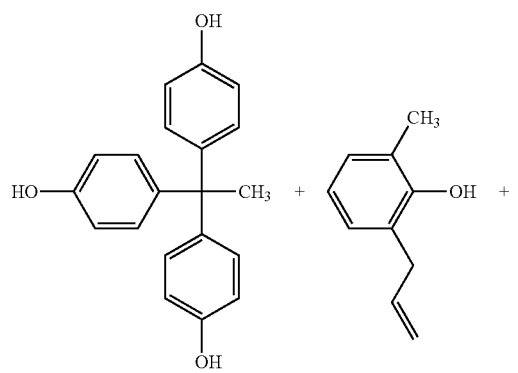

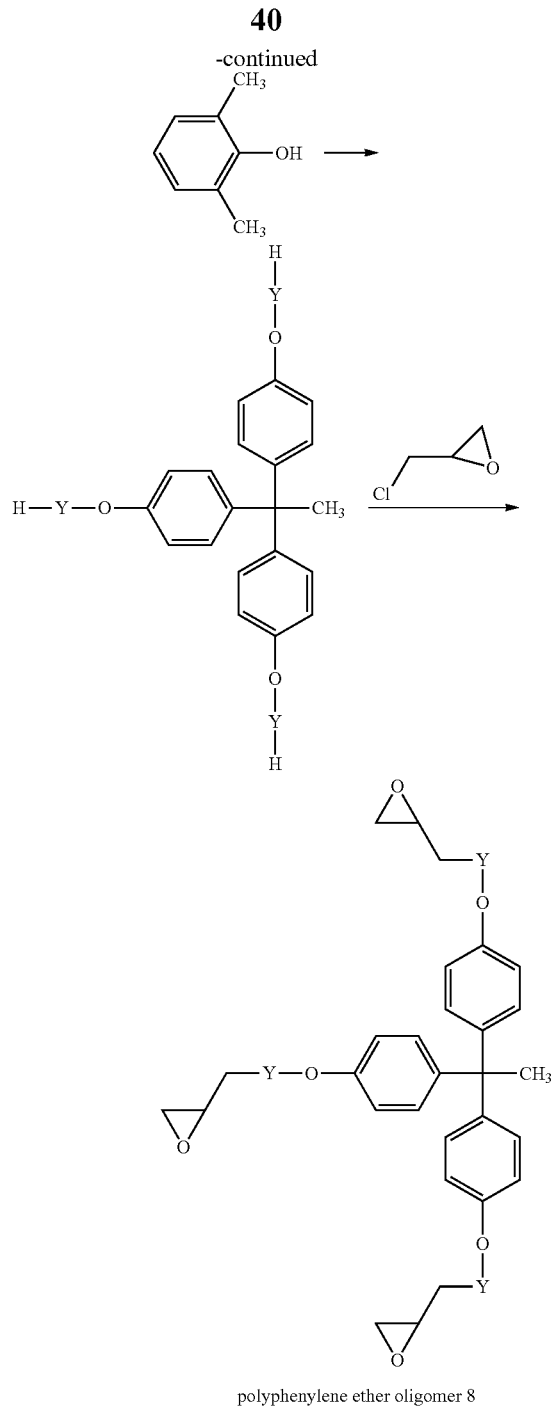

polyphenylene ether oligomer 8

In the equation illustrated above, each of the main chains Y may have the same or different moieties. For polyphenylene ether oligomer 8, Y had repeat units

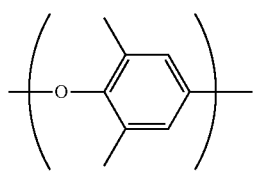

and

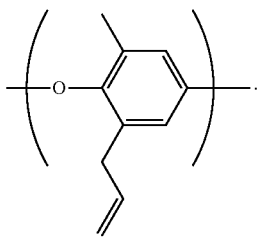

The number of

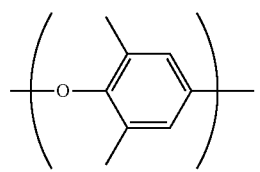

was i, and i was a positive integral. The number of

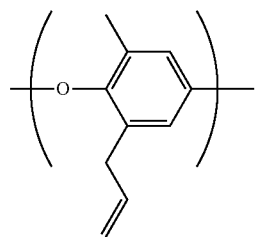

was j, and j was a positive integral. The sum of i and j was in a range of about 6 to about 300. In addition, repeat units

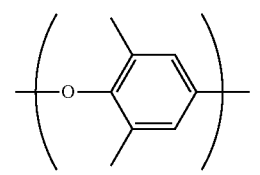

and

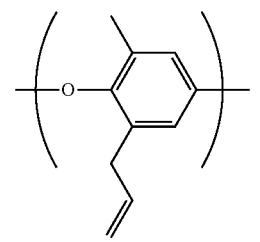

were arranged in an irregular or intermittent order. More specifically, Y was bonded to the oxygen moieties of the core structure

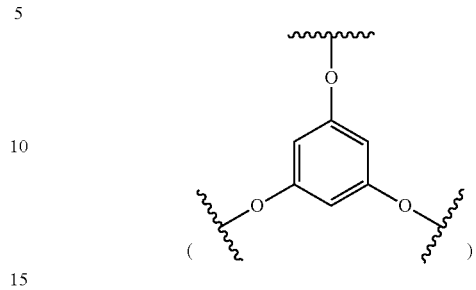

through the carbons in the benzene ring of the repeat units

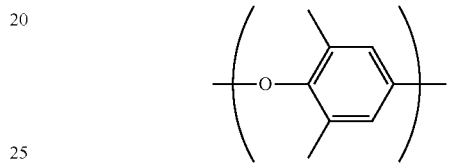

and

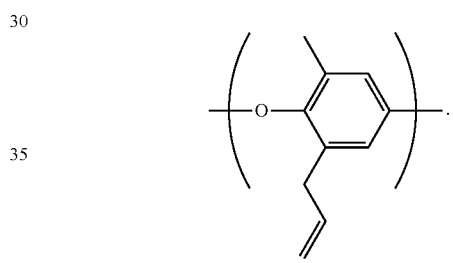

In addition, the oxygen moiety of the terminal repeat unit

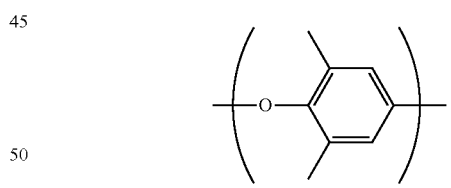

or

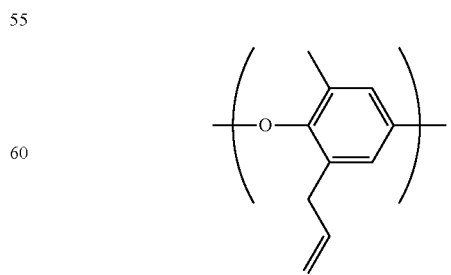

was bonded to the methacryloyl group.

Figure 11:
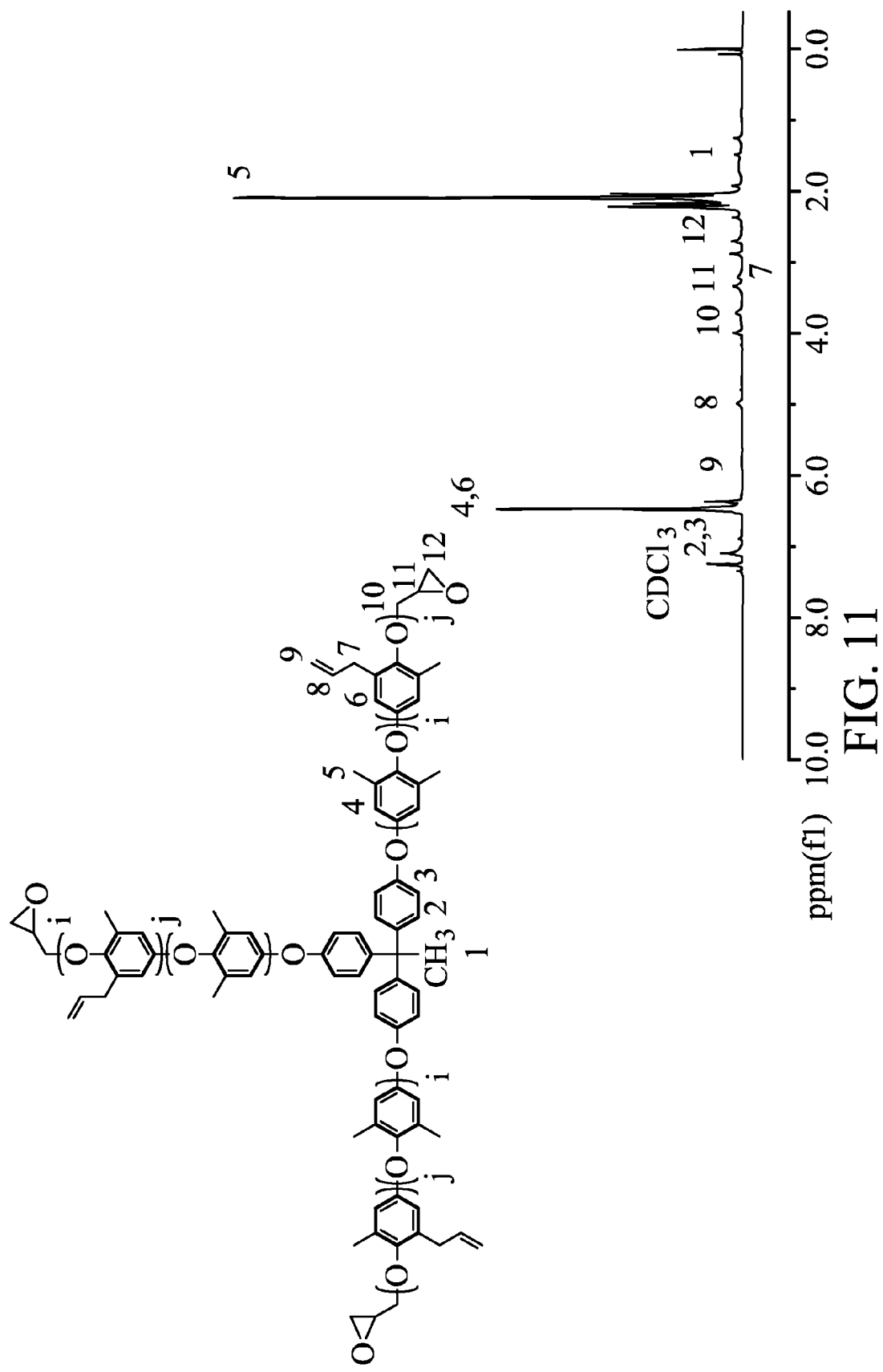
FIG. 11 illustrates the $^1$H-NMR spectrum of the polyphenylene ether oligomer prepared from Example 8

FIG. 11 illustrates the $^1$H NMR spectrum of the polyphenylene ether oligomer 8 and the results are assigned as follow: δ1.6 ppm (1), δ2.18 ppm (5), δ 2.6-2.8 ppm (12), δ 3.2 ppm (7), δ3.42 ppm (11), δ3.6-3.6 ppm (10), δ4.96 ppm (8), δ5.9 ppm (9), δ6.3 ppm (4,6),0 δ7.08 ppm (2,3).

In addition, the polyphenylene ether oligomer 8 was analyzed by Gel Permeation Chromatography (GPC), and number-average molecular weight (Mn) of the polyphenylene ether oligomer 8 was about 3730 and polydispersity (DPI) was about 1.36.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A polyphenylene ether oligomer having the following formula I:

$$(Z-Y)_3-X \quad \text{Formula (I)}$$

wherein X is

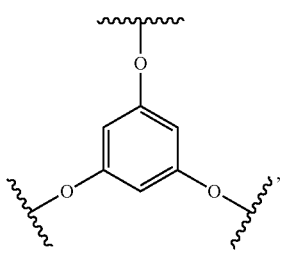

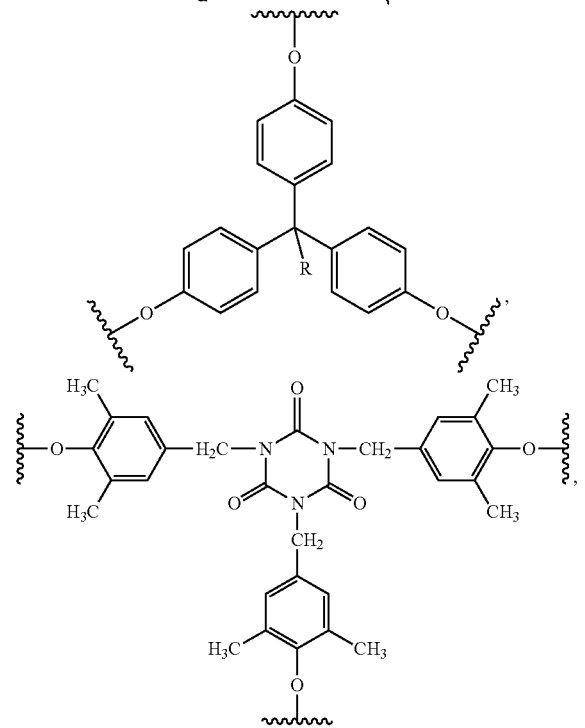

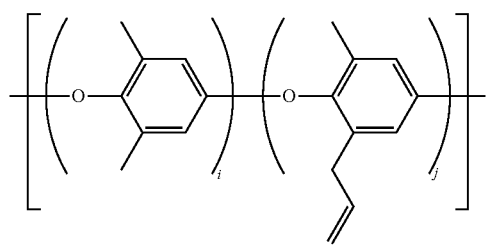

R is H or $C_{1-6}$ alkyl group;
Y independently is a moiety polymerized by at least two different phenol-based compounds, wherein the at least two different phenol-based compounds each independently has a substituted group, and the substituted group is a methyl group or an allyl group independently; and
Z independently is H, acryloyl group, allyl group, vinylbenzyl group, epoxypropyl group, methylacryloyl group, propargyl group, or cyanoallyl group.

2. The polyphenylene ether oligomer as claimed in claim 1, wherein Y is a moiety polymerized by 2,6-dimethylphenol and 2-allyl-6-methylphenol.

3. The polyphenylene ether oligomer as claimed in claim 1, wherein Y has the following formula:

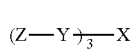

wherein i is a positive integral; j is a positive integral; a sum of i and j is in a range from 6 to 300, and repeat units

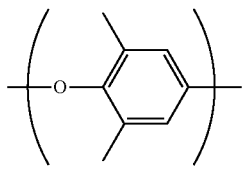

and

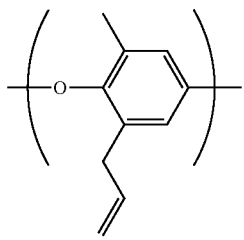

are arranged in an irregular or intermittent order.

4. The polyphenylene ether oligomer as claimed in claim 1, wherein Z is H, epoxypropyl group, vinylbenzyl group, or methylacryloyl group.

5. The polyphenylene ether oligomer as claimed in claim 1, wherein a number-average molecular weight of the polyphenylene ether oligomer is larger than 600.

6. The polyphenylene ether oligomer as claimed in claim 1, wherein a number-average molecular weight of the polyphenylene ether oligomer is in a range from 1200 to 12000.

7. The polyphenylene ether oligomer as claimed in claim 1, wherein Y has the following formula:

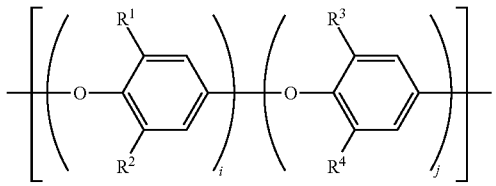

wherein i is a positive integral; j is a positive integral; a sum of i and j is in a range from 6 to 300; $R^1$ is hydrogen, or $C_{1-6}$ alkyl group; $R^2$ is $C_{1-6}$ alkyl group; $R^3$ is hydrogen, or $C_{1-6}$ alkyl group; $R^4$ is $C_{1-6}$ alkyl group, or allyl group; $R^2$ is different from $R^4$, and repeat units

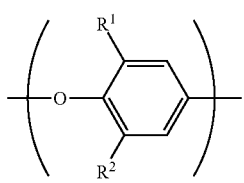

and

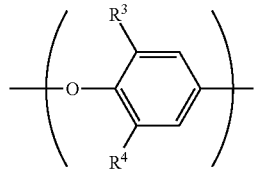

are arranged in an irregular or intermittent order.

8. The polyphenylene ether oligomer as claimed in claim 1 having a structure of the following formula (II):

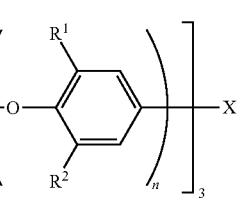

formula (II)

wherein X is

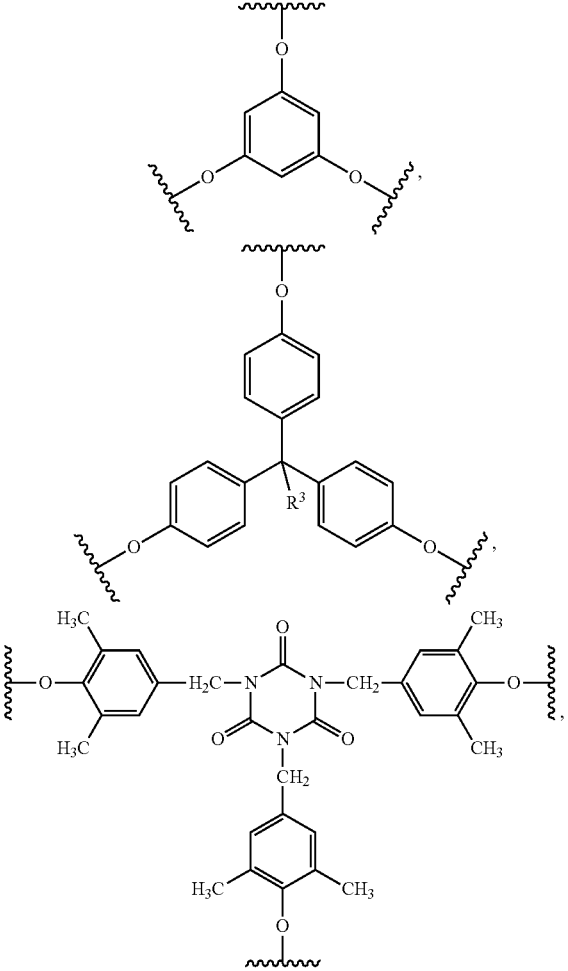

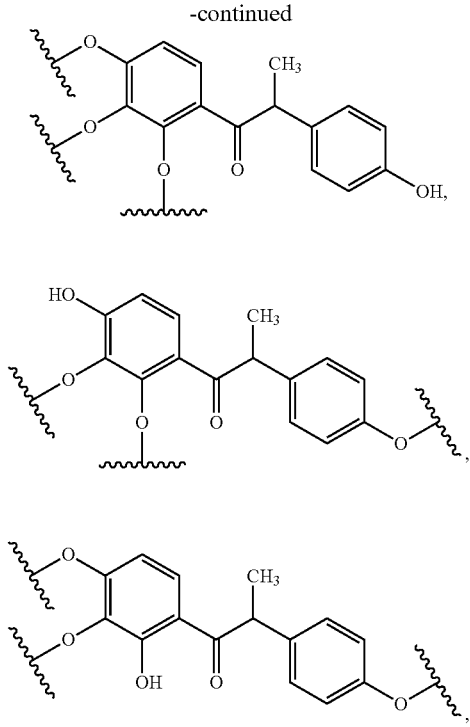

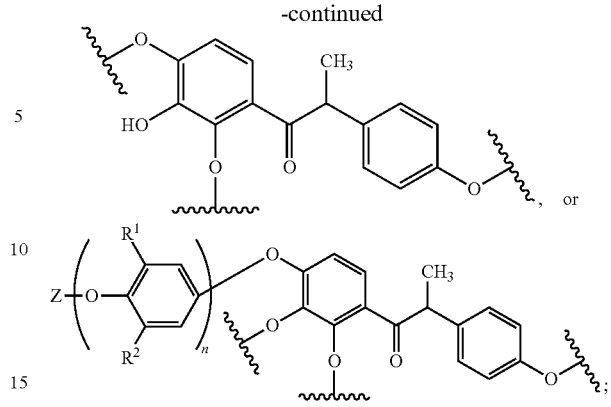

n is a positive integral from 6 to 300 independently;
R is H or $C_{1-6}$ alkyl group;
$R^1$ is H or $C_{1-6}$ alkyl group;
$R^2$ is $C_{1-6}$ alkyl group or allyl group independently;
Z independently is H, acryloyl group, allyl group, vinylbenzyl group, epoxypropyl group, methylacryloyl group, propargyl group, or cyanoallyl group.

9. An article, which comprises the polyphenylene ether oligomer as claimed in claim 1.

10. The article as claimed in claim 9, wherein the article is a high frequency substrate, high temperature additive, coating material, or adhesive.

* * * * *